United States Patent [19]

Burke, Jr., deceased et al.

[11] 4,107,126

[45] Aug. 15, 1978

[54] VINYLIC FILLER PIGMENTS AND PROCESSES FOR PRODUCING SAME

[75] Inventors: Oliver W. Burke, Jr., deceased, late of Fort Lauderdale, Fla., by Norma Scala, administratix; Victor T. Humphreys, Pompano Beach, Fla.

[73] Assignees: Marion Darrah; Joseph Y. Houghton, both of Pompano Beach, Fla. ; co-trustees

[21] Appl. No.: 712,160

[22] Filed: Aug. 6, 1976

[51] Int. Cl.$^2$ .................... C08L 61/10; C08F 289/00
[52] U.S. Cl. .......................................... 260/38; 8/62; 8/63; 106/308 M; 260/29.3; 260/29.4 UA; 260/29.6 NR; 260/29.6 RB; 260/39 P; 260/42.21; 260/42.29
[58] Field of Search ...... 260/29.3, 29.4 UA, 29.6 NR, 260/38, 39 P, 39 R, 42.21, 42.29; 106/308 M

[56] References Cited

U.S. PATENT DOCUMENTS

| | | | |
|---|---|---|---|
| 2,480,821 | 9/1949 | Connell | 260/42.21 |
| 3,190,850 | 6/1965 | Burke, Jr. | 260/38 |
| 3,423,358 | 1/1969 | Burke, Jr. | 260/41 |

*Primary Examiner*—Theodore E. Pertilla
*Attorney, Agent, or Firm*—Hall & Houghton

[57] ABSTRACT

Improved insoluble vinylic filler pigment products and process for producing the same. The vinylic filler pigment consists essentially of (a) spheruloids of organic polymer material three dimensionally cross-linked to essential insolubility in any physical solvent and having primary particles in the colloidal size range of about 5 millimicrons to not more than 4.0 microns average diameter and having fixed onto the surfaces thereof from 0.5 to 200% by weight based on the spheruloids of (b) preformed microground insoluble organic and/or inorganic pigment material having an average particle size which is below 0.5 micron in diameter, and less than the average particle size of the vinylic filler spheruloids. The material (b) is intimately combined in aqueous dispersion with a never dried aqueous latex of the spheruloids, and the combination is then recovered. The combination may include, based on the preformed pigment material present, from 0 to an equal weight of a pigment bonding or modifying agent selected from a defined class and from 0 to an equal weight of nitrogenous material selected from a defined class; said improved vinylic filler pigment spheruloids preferably having been treated at a sufficient temperature and time, while in the aqueously wet never previously dried state, with from 0.5 to 35% by weight, based on said spheruloids, of low boiling hydrocarbon solvent preferably applied in conjunction with an oil soluble surface active agent, which treatment prevents the vinylic filler pigment product from forming hard agglomerates on drying, and the so treated improved vinylic filler pigment product thereafter having been dried and thereafter preferably having also been subjected to sufficient heating to effectively remove said low boiling solvent.

26 Claims, No Drawings

VINYLIC FILLER PIGMENTS AND PROCESSES FOR PRODUCING SAME

BACKGROUND OF THE INVENTION

1. Field of the Invention

This invention relates to physical solvent insoluble vinylic filler pigments and aims generally to improve the same and to provide novel process for their production.

2. Description of the Prior Art

It has been shown in U.S. Pat. Nos. 3,190,850 and 3,423,358 that vinylic filler pigments can be made by combining with vinylic fillers water soluble dyestuffs and dyestuff components and/or metal salts in the water soluble form and thereafter depositing the same on the surface of the vinylic filler in water insoluble form by precipitation or by chemical reaction between said vinylic filler and said coloring component.

The aforesaid vinylic filler pigments of U.S. Pat. Nos. 3,190,850 and 3,423,358, being prepared from the water soluble dyes and precursors thereof, suffer from the limitations that they have correspondingly limited resistance to chemical attach and limited light stability.

OBJECTS OF THE PRESENT INVENTION

The present invention aims in particular to provide improved vinylic filler products and processes which overcome the disadvantages above noted, and is based on the discovery that vinylic filler materials may be pigmented directly with finely dispersed, water insoluble organic and inorganic pigmentary substances fixed to the surface of vinylic filler particles from aqueous suspension thereof.

SUMMARY OF THE INVENTION

We have discovered that the vinylic filler particles will attract and cause to be deposited thereon, from aqueous suspension, water insoluble organic and inorganic pigment and leuco pigment material and combinations thereof, provided said water insoluble pigment material is in a sufficiently finely divided form so as to be near or even below the optimum pigmentary particle size range for such material and smaller than the vinylic filler particles. Such finely divided water insoluble pigment particle size can be obtained by available methods of grinding, e.g. ball milling or sand grinding in aqueous medium. By the discovery that such water insoluble pigment substances, while still in the finely divided aqueous state can be caused to be deposited onto the vinylic filler particle and adhered thereon either by hydrogen bonding or ionic bonding, vinylic filler pigments can be made in accordance with the present invention utilizing the light-fast, stable, water insoluble preformed and micronized organic and inorganic pigment materials. While in the aqueously wet, never previously dried state, such improved vinylic filler pigment products can be further treated by the process with a minor amount, in the range of 0.5 to 35% by weight of said vinylic filler pigment product of a low boiling hydrocarbon solvent preferably applied in conjunction with an oil soluble surface active agent, which treatment we have found to prevent the wet vinylic filler pigment from forming hard agglomerates on drying.

Improved vinylic filler pigments produced by this new process retain all the advantages of the older dyed vinylic filler pigments while attaining the light-fastness and chemical stability of the water insoluble pigmentary component, and are therefore particularly useful in many fields of coloration where the lower light-fastness and lower chemical stability of the old vinylic filler pigments precluded their application, as in exterior paints and decorative coatings and thermoplastic compositions.

Said improved vinylic filler pigments can be produced, by the process, in wet presscake, dry pigment or soft powdered readily redispersible forms, and by selection of the monomers and in the manufacture of the polymer portion thereof and/or the emulsifying or surface active agents, particularly when such are of a polymeric nature themselves, be given functionality to impart cationic or anionic nature to same.

Many of the organic and inorganic pigments available for coloration of thermoplastic and oil based systems have numerous disadvantages especially since they tend to pick up moisture during incorporation into thermoplastic as in extrusion processes, and by agglomeration cause speckiness and poor dispersion as well as considerable loss in time and money due to these large pigment agglomerations plating out on the extruder screens, and thus being lost tinctorially as well as causing losses in operating time. By incorporating such pigments, especially those having high inherent cost in themselves, into improved vinylic filler pigment products, great advantage may also be realized in time and money for the user, as the improved vinylic filler pigments do not tend to form agglomerates when under rigorous processing conditions such as are encountered in coloration of thermoplastic compositions.

GENERAL PROCEDURE

The general procedure for preparing improved vinylic filler pigments in accordance with the process of this invention is as follows:

A particulate pigment composition is first provided consisting essentially of organic or inorganic pigment or combinations thereof having its particles dispersed in aqueous medium with the aid of sufficient active agent material to effect said dispersion and stabilize the pigment against agglomeration into larger particles. This pigment dispersion may be effected in any suitable manner, e.g. by grinding such as sand grinding, ball milling, colloid milling etc., that is capable of obtaining the necessary degree of dispersion and fineness of particle size. Within the limits of this invention the pigment particles may be of any desired size within the normal pigmentary range for said materials, and even below said normal pigmentary range in the case of organic color pigments, provided such size is less than the size of the particular vinylic filler being pigmented. The more uniform the grind, the more efficient will be the deposition and fixation of said particles to the spheruloidal vinylic filler particle surface, and the greater the tonal strength and brilliance of the resulting vinylic filler pigment.

The aqueous pigment dispersion thus provided is mixed in selected proportion with a selected vinylic filler latex as produced by any of the processes given herein or in U.S. Pat. Nos. 3,190,850 and 3,423,358, herein incorporated by reference, and the solids of the mixture are then coagulated. Typical vinylic filler latex and grafted vinylic filler latex recipes are given hereinafter in the tables preceding the specific examples exemplifying the production of these various types of improved vinylic filler pigments, and preferably the coagulation is effected after intimate mixing by the addition of a coagulating agent, such as a dilute organic or inorganic acid or base for ionic systems or a water soluble alcohol for ionic or nonionic systems, sufficient to cause fixation of the pigment particles in their finely divided state to the surface of the vinylic filler by ionic or hydrogen bonding, together with coagulation of the resulting vinylic pigment solids into soft flocks or agglomerates that can readily be separated from the serum by suitable methods, e.g. filtration or centrifuging.

If desired, prior to the fixation step, the mixture of aqueous pigment dispersion and vinylic filler latex may be further combined with a pigment bonding or modifying agent to impart specific properties to the final product or to assist in bonding the pigment material to the vinylic filler surface.

Prior to such an isolation step it is advantageous, especially if it is intended to dry the product so that it can be more readily adaptable for use in oil based and thermoplastic systems, to incorporate into the process at this point a treatment to reduce or prevent the cohesion of the individual vinylic filler particles between themselves on removal of the water phase. Such cohesion or attraction is believed to be principally due to hydrogen bonding or bridging taking place between the spheruloid vinylic filler pigment particles and is objectionable in as much as it yields the pigment in an extremely hard form on drying, consequently necessitating additional expensive physical grinding prior to use. Even with such grinding, because of the ultra fine nature of the optimum pigmentary size and the relatively narrow particle size range thereof, it is nearly impossible to effect complete reduction of a hard dried pigment by dry grinding alone to within said limits. This fact is well illustrated in the "Pigment Handbook" edited by Temple C. Patton, published by John Wiley & Sons, 1973, especially in Volume III hereby incorporated by reference.

We have discovered that by introducing a minor quantity of a soft powdering agent or additive, hereinafter defined, and treating the vinylic filler pigment pigment while still in aqueous suspension, to a period of agitation accompanied by heating, the so treated vinylic filler pigment product can be separated from the aqueous phase by any suitable method, e.g. filtering, washing and drying to yield a vinylic filler pigment in soft powdered form which is readily redispersed in the vehicle of use and thus gives the full available tonal strength and shade brilliance.

DEFINITION OF TERMS USED HEREIN (1) Organic Color Pigments

The term "organic color pigments" as used herein designates the organic pigmentary materials which are colored as distinguished from water white or opaque white materials, and from the water soluble dyes and dye components, unless said dyes and dye components have already been reacted prior to use in this invention to produce a water insoluble hence pigmentary compound.

This invention is generally applicable to such organic color pigments and is not limited to the use of any particular organic color pigment or combination thereof. As illustrative but not restrictive of those that may be used and improved by the invention are those organic color pigments set out in "The Chemistry of Synthetic Dyes" by K. Venkataraman, Vol. V, especially Section 6, pages 314-474, Academic Press, New York, N. Y. (1971) herein incorporated by reference, which includes pigments of the well known Azo class exemplified by the acetocetarylide azo, the pyrazolone azo, the α naphthol azo, the 2-hydroxy-3-naphthoic acid azo, the 2-hydroxy-3-naphtharylide azo and the naphtholsulfonic acid azo pigments; the triphenylmethane pigments and related pigmentary compounds; the phthalocyanine pigments; the anthraquinone indigoid and related pigments; the quinacridone pigments; the dioxazine pigments; the azamethine pigments; the fluororubine pigments; the naphthindolizinedione pigments; and other miscellaneous organic pigmentary compositions; and those set out in "The Chemistry of Synthetic Dyes and Pigments" by Herbert A. Lubbs, Reinhold, New York (1955), herein incorporated by reference, and in "The Color Index" 3rd Edition (1973) published jointly by the "British Society of Dyers and Colourists" and the "American Association of Textile Chemists and Colorists", also herein incorporated by reference.

Typical representatives of these organic color pigments are set forth in the examples herein by way of illustration.

(2) Inorganic Color Pigments

The term "inorganic color pigments" as used herein designates the inorganic pigmentary materials which are colored as distinguished from water white or opaque white material.

This invention is generally applicable to such inorganic color pigments and is not limited to the use of any particular inorganic color pigment or combination thereof. As illustrative but not restrictive of those that may be used and improved by the invention are the inorganic color pigments set out in the "Handbook of Chemistry and Physics" edited by Weast, 55th Edition 1974-1975, published by the Chemical Rubber Co., herein incorporated by reference, and in "The Color Index" 3rd edition (1973) published jointly by the "British Society of Dyers and Colourists" and the "American Association of Textile Chemists and Colorists", also herein incorporated by reference. Typical representatives of these inorganic color pigments are set forth in the examples herein by way of illustration.

(3) Inorganic Opaque and Transparent White Pigments

The term "inorganic opaque white" or "inorganic transparent white" pigments as used herein designates the inorganic pigmentary materials which are white or noncolored in appearance, both those of high refractive index (opaque) and low refractive index or hiding power (transparent) as are set out in the "Handbook of Chemistry and Physics", edited by Weast, 55th edition 1974-1975, published by the Chemical Rubber Co., herein incorporated by reference, and in "The Color Index", 3rd edition published jointly by the "British Society of Dyers and Colourists" and the "American Association of Textile Chemists and Colorists", herein incorporated by reference.

Typical representatives of these inorganic white pigments are set forth in the examples herein by way of illustration.

(4) Vinylic Filler. Vinylic Filler Latex

The terms "Vinylic Filler" and "Vinylic Filler Latex" as herein employed connote the homopolymerization and the multipolymerization products, as colloidal size particles, obtainable from polymerizable substances containing one or more polymerizable unsaturated linkages, more specifically from monomers containing a single vinyl or allyl group or plurality of, or combinations of vinyl and allyl groups, and combinations of such monomers with or without other polymerizable unsaturated compounds provided at least one of the monomers or unsaturated compounds is a cross-linking agent and the colloidal polymerization products therefrom are cross-linked to a condition of essential insolubility in all physical solvents. Such vinylic filler type latices and methods of preparing the same are more fully described in U.S. Pat. Nos. 3,190,850 and 3,423,358 together with the monomers and copolymerizable unsaturated compounds available for the manufacture of same, herein incorporated by reference.

Said vinylic filler latices are prepared according to polymerization recipes of which the following represents typical limits for a vinylic filler:

Monomer and or mixtures thereof (containing cross-linking agent) . . . 100
Water . . . 100 to 350
Emulsifying agents . . . 0 to 20
Polymerization catalysts (peroxide, redox, etc.) . . . 0.02 to 2.0

Graft vinylic filler latices are prepared according to polymerization recipes of which the following represent typical limits:

Latex from previous steps (see limits above)
Monomer and/or mixtures thereof . . . 0 to 100
Water . . . 0 to 350
Emulsifying agent . . . 0 to 20
Polymerization catalyst . . . 0 to 2.0

If methanol or other antifreeze solution in water is used in place of water in the recipes shown above then subzero polymerization temperatures can be used or if a pressure vessel is provided the temperature can be raised to the range of 150° to 250° C. or to a critical upper temperature at which emulsions are no longer stable. It is convenient, however, to use 40° to 100° C. or above and a polymerization time of 8 to 16 hours where vinyl monomers are principally concerned and 80° to 150° C. where allyl monomers principally are concerned.

It is of course understood that vinylic fillers are formed by either single step or multi-step polymerization. Thus, multi-polymer vinylic fillers can be formed from hydrophobic polymers, or from hydrophilic polymers (e.g. vinylic fillers from polymeric emulsifiers) by a cross-linking polymerization step.

It is understood that graft vinylic fillers are formed by grafting onto previously formed vinylic fillers, either noncross-linked or cross-linked elastomers, plastomers, or condensation products and such grafts when themselves of noncross-linking materials are usually in amounts equal to or less than the amount of vinylic core material present.

Vinylic fillers and graft vinylic filler latices can be prepared from numerous monomers as for example those set forth in Tables I and II hereafter, and in a similar manner many other monomers, used in the polymerization art, can be combined into vinylic and graft vinylic fillers. The monomers available to one skilled in the art are noted in the following books on polymerization: "Styrene, Its Polymers, Copolymers and Derivatives" by R. H. Boundy and R. F. Boyer, 1952, Reinhold Publishing Corporation, New York, N.Y. "Principles of Polymer Chemistry" by Paul J. Flory, 1953, Cornell University Press, Ithaca, N.Y. "Polymerisationkinetik" by L. Kuechler, 1951, Spring-Verlag, Heidelberg, Germany, Volume I, "Einstoffpolymerisation", Volume II, "Mehrstoffpolymerisation" by Franz Krczil, 1941, Akademische-Verlag, Leipzig, Germany. Polyvinylchlorid and Vinylchlorid-Mischpolymerisate by Franz Kainer (1951), Springer-Verlag, Heidelberg, Germany.

TABLE I

Representative Vinylic Filler Latex Recipes

| Recipe | I-A | I-B | I-C | I-D | I-E | I-F | I-G | I-H | I-J | I-K | I-L |
|---|---|---|---|---|---|---|---|---|---|---|---|
| Water | 300 | 300 | 300 | 300 | 300 | 300 | 300 | 600 | 600 | 600 | 600 |
| Monomers: | | | | | | | | | | | |
| Styrene | 80 | 90 | 80 | 80 | 98 | 80 | 80 | 94 | 96 | 90 | — |
| Methacrylic acid | — | — | — | 10 | — | 10 | — | — | — | — | — |
| 4-vinylpyridine | — | — | — | — | — | — | 10 | — | — | — | — |
| Acrylic acid | — | — | — | — | — | — | — | 4 | — | — | — |
| Methacrolein | 10 | — | — | — | — | — | — | — | — | — | — |
| Dimethylaminoethylmethacrylate | — | — | 10 | — | — | — | — | — | — | — | — |
| Acrylonitrile | — | — | — | — | — | — | — | — | 1.5 | — | — |
| Vinylacetate | — | — | — | — | — | — | — | — | — | — | 100 |
| Divinylbenzene (100% basis)[1] | 10 | 10 | 10 | 10 | 2 | 10 | 10 | 2 | 2 | 10 | — |
| Ethyleneglycoldimethacrylate | — | — | — | — | — | — | — | — | — | — | 5 |
| Emulsifier: | | | | | | | | | | | |
| Alkyl-aryl sodium sulfonate (Santomerse-3, Monsanto) | 10 | 10 | 10 | 10 | 6 | 10 | 10 | — | — | — | — |
| Lauryl sodiumsulfonate (Duponol ME, duPont) | — | — | — | — | — | — | — | — | — | 0.3 | 0.3 |
| Styrene-maleic acid copolymer[2](Ratio 47 to 53) | — | — | — | — | — | — | — | — | — | 10 | 10 |
| Polyvinyl alcohol (Eivanol,51-05, duPont) | — | — | — | — | — | — | — | — | — | — | 1 |
| Catalyst system and modifiers: | | | | | | | | | | | |
| Disopropylbenzene hydroperoxide | 0.6 | 0.6 | 0.5 | 0.5 | 0.6 | 0.6 | 0.6 | — | — | — | — |
| Tetraethylenepentamine | — | — | 0.15 | — | — | — | 0.14 | — | — | — | — |
| Potassium chloride | 0.5 | 0.5 | 0.5 | 0.5 | 0.5 | 0.5 | 0.25 | — | — | — | — |
| Potassium pyrophosphate | 0.21 | 0.21 | 0.07 | 0.1 | 0.21 | 0.07 | 0.07 | — | — | — | — |
| Ferrous sulfate | 0.19 | 0.19 | 0.05 | 0.09 | 0.15 | 0.19 | 0.05 | — | — | — | — |
| Tertiarydodecyl mercaptan | 0.075 | 0.064 | — | 0.075 | 0.075 | 0.08 | — | — | — | — | — |
| Potassium persulfate | — | — | — | — | — | — | — | — | — | 1.0 | — |
| Ammonium persulfate | — | — | — | — | — | — | — | 1.0 | 1.0 | — | 0.5 |
| Aqueous ammonia 28% | — | — | — | — | — | — | — | — | — | 6.6 | 10 |
| Sodium bisulfite | — | — | — | — | — | — | — | 0.5 | 0.5 | 0.5 | 0.3 |
| Polymerization conditions: | | | | | | | | | | | |
| Temperature, ° C | 50 | 60 | 60 | 60 | 60 | 60 | 60 | 60 | 60 | 60 | 70 |
| Time, hours | 12 | 12 | 12 | 12 | 17 | 12 | 12 | 18 | 18 | 18 | 15 |
| Total dry solids, percent | 25.7 | 26.8 | 18.2 | 26.4 | 25.8 | 26.9 | 26.9 | 13.6 | 13.7 | 14.0 | 15.6 |

TABLE I-continued

| Recipe | Representative Vinylic Filler Latex Recipes | | | | | | | | | | | |
|---|---|---|---|---|---|---|---|---|---|---|---|---|
| | I-A | I-B | I-C | I-D | I-E | I-F | I-G | I-H | I-J | I-K | I-L |
| Type of vinylic filler | 3 | 4 | 5 | 6 | 4 | 6 | 7 | 6 | 8 | 6 | 6 |

[1]The cross-linking agent divinylbenzene is commercially available in 50% purity.
[2]In 1,300 grams of benzene under reflux are polymerized in 3 hrs. 70 grams of styrene, 80 grams of maleic anhydride catalyzed by 2.25 grams of benzoyl peroxide and modified by 1.5 grams of tert.-dodecylmercaptan.
[3]Reactive aldehyde
[4]Non-polar
[5]Basic
[6]Acid
[7]Pyridine
[8]Polar

TABLE II

| Recipe | Representative Vinylic Filler Latex Recipes | | | | | | | | | | |
|---|---|---|---|---|---|---|---|---|---|---|---|
| | II-A | II-B | II-C | II-D | II-E | II-F | II-G | II-H | II-J | II-K | II-L |
| Water | 300 | 300 | 300 | 300 | 300 | 300 | 300 | 600 | 600 | 600 | 600 |
| Monomers: | | | | | | | | | | | |
| Styrene | 88 | 96 | 88 | 87 | 98 | 86 | 88 | 94 | 96.5 | 90 | — |
| Methacrylic acid | — | — | — | 10 | — | 10 | — | — | — | — | — |
| 4-vinylpyridine | — | — | — | — | — | — | 10 | — | — | — | — |
| Acrylic acid | — | — | — | — | — | — | — | 4 | — | — | — |
| Methacrolein | 10 | — | — | — | — | — | — | — | — | — | — |
| Dimethylaminoethylmethacrylate | — | — | 10 | — | — | — | — | — | — | — | — |
| Acrylonitrile | — | — | — | — | — | — | — | — | 1.5 | — | — |
| Vinylacetate | — | — | — | — | — | — | — | — | — | — | 100 |
| Tung oil | 2 | 2 | — | — | — | — | 2 | — | — | 10 | 2.5 |
| Oiticica oil | — | 2 | — | 3 | — | 4 | — | 2 | — | — | 2.5 |
| Isano oil | — | — | 2 | — | 2 | — | — | — | 2 | — | — |
| Emulsifier: | | | | | | | | | | | |
| Alkyl-aryl sodium sulfonate (Santomerse-3,Monsanto) | 10 | 10 | 10 | 10 | 6 | 10 | 10 | — | — | — | — |
| Lauryl sodiumsulfonate (Duponol ME, duPont) | — | — | — | — | — | — | — | — | — | 0.3 | 0.3 |
| Styrene-maleic acid copolymer[2] (Ratio 47 to 53) | — | — | — | — | — | — | — | — | — | 10 | 10 |
| Polyvinyl alcohol (Eivanol, 51-05, duPont) | — | — | — | — | — | — | — | — | — | — | 1 |
| Catalyst system and modifiers: | | | | | | | | | | | |
| Disopropylbenzene hydroperoxide | 0.6 | 0.6 | 0.5 | 0.5 | 0.6 | 0.6 | 0.6 | — | — | — | — |
| Tetraethylenepentamine | — | — | 0.15 | — | — | — | 0.14 | — | — | — | — |
| Potassium chloride | 0.5 | 0.5 | 0.5 | 0.5 | 0.5 | 0.5 | 0.25 | — | — | — | — |
| Potassium pyrophosphate | 0.21 | 0.21 | 0.07 | 0.1 | 0.21 | 0.07 | 0.07 | — | — | — | — |
| Ferrous sulfate | 0.19 | 0.19 | 0.05 | 0.09 | 0.15 | 0.19 | 0.05 | — | — | — | — |
| Tertiarydodecyl mercaptan | 0.075 | 0.064 | — | 0.075 | 0.075 | 0.08 | — | — | — | — | — |
| Potassium persulfate | — | — | — | — | — | — | — | — | — | 1.0 | — |
| Ammonium persulfate | — | — | — | — | — | — | — | 1.0 | 1.0 | — | 0.5 |
| Aqueous ammonia 28% | — | — | — | — | — | — | — | — | — | 6.6 | 10 |
| Sodium bisulfite | — | — | — | — | — | — | — | 0.5 | 0.5 | 0.5 | 0.3 |
| Polymerization conditions: | | | | | | | | | | | |
| Temperature, ° C. | 50 | 60 | 60 | 60 | 60 | 60 | 60 | 60 | 60 | 60 | 70 |
| Time, hours | 12 | 12 | 12 | 12 | 17 | 12 | 12 | 18 | 18 | 18 | 15 |
| Total dry solids, percent | 25.7 | 26.8 | 18.2 | 26.4 | 25.8 | 26.9 | 26.9 | 13.6 | 13.7 | 14.0 | 15.6 |
| Type of vinylic filler | 3 | 4 | 5 | 6 | 4 | 6 | 6 | 7 | 6 | 8 | 6 | 6 |

[1]The crosslinking agent divinylbenzene is commercially available in 50% purity.
[2]In 1,300 grams of benzene under reflux are polymerized in 3 hrs. 70 grams of styrene, 80 grams of maleic anhydride catalyzed by 2.25 grams of benzoyl peroxide and modified by 1.5 grams of tert.-dodecylmercaptan.
[3]Reactive aldehyde
[4]Non-polar
[5]Basic
[6]Acid
[7]Pyridine
[8]Polar Table III is illustrative of representative recipes for graft vinylic fillers. In this table core vinylic filler latics from Tables I and II are grafted with additional polymeric material.

TABLE III

| Recipe | Representative Graft Vinylic Filler Latex Recipes | | | | | |
|---|---|---|---|---|---|---|
| | III-A | III-B | III-C | III-D | III-E | III-F |
| Vinylic filler latex type | 1 | 2 | 1 | 1 | 1 | 3 |
| Latex designation (See Table I) | I-D | II-E | I-D | II-F | I-F | II-G |
| Latex quantity | 410 | 407 | 418 | 410 | 690 | 435 |
| Water | 100 | 50 | — | 400 | — | 100 |
| Monomers for grafts: | | | | | | |
| Butadiene | 12.75 | — | — | — | 20 | — |
| 4-vinylpyridine | 2.25 | — | — | — | — | — |
| Methylmethacrylate | — | 100 | — | — | — | — |
| Styrene | — | — | 20 | — | — | — |
| Methacrolein | — | — | 10 | — | — | — |
| Catalyst: | | | | | | |
| Azobis (isobutyronitrile) | 0.1 | 1.0 | 1.0 | — | 0.5 | — |
| Ammonium persulfate | — | — | — | — | 0.1 | — |
| Chemical addition reactions: | | | | | | |
| Dodecyl mercaptan | — | — | — | — | 0.85 | — |
| Propylene oxide | — | — | — | 20 | — | — |
| 28% Ammonia | — | — | — | — | — | 4.8 |
| Urea | — | — | — | — | — | 13.5 |
| Formaldehyde 36% | — | — | — | — | — | 42.7 |
| Sodium hydroxide | 0.5 | — | — | — | — | 0.1 |
| Butyl mercaptan | — | — | — | — | 8.25 | — |
| Polymerization conditions: | | | | | | |
| Polymerization temp., 0° C. | 60 | 60 | 60 | 60 | 60 | 60 |
| Polymerization time, hrs. | 17 | 17 | 17 | 48 | 64 | 17 |
| Total dry solids, percent | 22.6 | 32.4 | 33.3 | 14.9 | 28.0 | 28.0 |
| Type of graft vinylic filler | 4 | 5 | 6 | 7 | 8 | 9 |

[1]Acid.
[2]Non-polar.
[3]Pyridine.
[4]Acid base.
[5]Polar acrylate.
[6]Acid aldehyde.
[7]Acid ester.
[8]Polar sulfur.
[9]Polar condensate.

(5) Latex

By the term latex is meant the aqueous dispersion of the vinylic filler composition in which the vinylic filler particles are so small that they are essentially non-setting, i.e. maintained in suspension by Brownian movement.

(6) Micronizing

The term "micronizing as used herein connotes the physical reduction in particle size in an aqueous medium of the pigment materials by means of an appropriate grinding system, e.g. a ball mill or a sand mill, to the particle size desired in the step concerned, with the aid of a surface active system to assist the grinding and inhibit agglomeration of the micronized particles into aggregate particles of larger size. Both ball mills and sand mills or sand grinders are well known to the pigment art and commercially available. The balls in the case of a ball mill, or the sand or like grinding material in the case of the sand mill, are herein termed micronizing media.

(7) pH Adjustment

By pH adjustment is meant the addition of either acid or base to adjust the pH for micronizing to within the desired range which may be most efficient for the purpose in question, e.g. to be compatible with the pigmentary, or surfactant materials being used. Preferred additives are the organic acids such as acetic, formic, hydroxyacetic to lower the pH, and ammonium hydroxide to raise the pH. Inorganic acids and/or bases may be used provided they do not form objectionable amounts of salts which would interfere with the process or attack the equipment being used.

(8) Microscopic Examination

The term microscopic examination as used in the Examples hereinafter denotes examination with an optical microscope, i.e. a Leitz "Ortholux" research microscope, which is regarded as having a resolving power of 0.2 micron and a lower limit of visibility for well separated particles of 0.02 micron diameter, and average particle sizes herein set forth were determined accordingly.

(9) Surface Active Agent Material

Among the dispersing and/or emulsifying agents available for use as surface active agents herein we have found that the only essential criterion for such agent is that it effectively wet and disperse the pigmentary material being micronized, bearing in mind that due care must be taken in the selection to ensure compatibility with the vinylic filler latex with which the said pigmentary material is to be combined. Having regard to this criterion surface active agents or as they are more generally classified "surfactants" (which encompasses both grinding, wetting and emulsifying agents) may be either anionic, nonionic, cationic or amphoteric; of either singular molecular structure or polymeric nature; it being understood that when two or more of such agents are employed together they must be compatible with each other. For example nonpolymeric or polymeric anionic surfactants may be combined with each other and with nonionic and/or amphoteric surfactants, polymeric or nonpolymeric; and nonpolymeric or polymeric cationic surfactants may be combined with each other or with nonionic and/or amphoteric surfactants; and amphoteric and/or nonionic surfactants may be combined with each other. Thus it is possible to use a very wide range of commercially available surface active agents for achieving the degrees of grinding, and the production of improved vinylic filler pigments as hereinafter exemplified, comprehensive listings of which are set out in the treatises "Detergents and Emulsifiers 1974 Annual" by John W. McCutcheon, published by John W. McCutcheon, Inc., Morristown, New Jersey, and "Surface Active Agents and Detergents" by Anthony N. Schwartz et al, Interscience Publishers, Inc., New York (1958), Vol. 2, pages 153-172, each of which is herein incorporated by reference.

Among the commercially available surfactants may be mentioned the anionic surfactants, e.g. carboxylic acids and their derivatives, sulfonic esters, alkanesulfonates, alkylaryl sulfonates and phosphate esters; the nonionic surfactants e.g. polyethenoxy ethers of alkylphenols, polyethenoxy ethers of alcohols and mercaptans, difunctional and polyfunctional polyethenoxy esters, miscellaneous polyethenoxy esters, polyethenoxy compounds with amide and miscellaneous linkages and various polyhydroxy compounds; the cationic surfactants, e.g. the straight chain alkyl ammonium compounds, the cyclic alkylammonium compounds, the olefin derived compounds, and the quaternary compounds derived from the same; the amphoteric surfactants, e.g. those derived from betaines and phenolic solutions; and the polymeric surface active agents set out in the said McCutcheon and Schwartz et al treatises. Typical examples of representative surfactants of these classes and combinations thereof are set forth in the Examples hereinafter, it being understood that said Examples are but illustrative and not restrictive of the invention, e.g. the recently available fluorocarbon surfactants have also been found effective, especially when used in small proportions with other less expensive surfactants. Typical of these fluorocarbon surfactants are the "Zonyl" trade-marked fluorocarbon surfactants of the DuPont Company, such as Zonyl A or P (anionic), Zonyl C (cationic), Zonyl N (nonionic), and Zonyl B (amphoteric).

(10) Separation by Screening

Separation by screening or conventional screening when employed in the Examples herein, connotes that the micronized pigment is washed away from the micronizing medium and the screen with diluting liquid or a part thereof.

(11) Pigment Modifying Agent

The pigment material and/or vinylic filler pigment material may be modified either physically or chemically by the addition or incorporation of modifying material during the micronizing step of said pigment material or during the combination of the pigment material with the vinylic filler material or both. The modifying agent may be a bonding agent to aid in bonding the pigment particles to the vinylic filler particles, or it may be added as an aid in the fixation of the vinylic filler pigment material to a substrate of subsequent use. The modifying agent may thus comprise one or more of those substances which can be employed although not essential to the process, to obtain certain advantages or modifications to the process or products thereof. Such substances may include nitrogenous material such as water soluble or insoluble amines, imines and polyamines and polyimines, added to the inorganic pigment material during the micronizing step to render it more oleophilic, and/or water soluble or dispersible condensation resin products or the components thereof, added during the micronizing or subsequent steps.

Pigment bonding agents which may be used to aid fixation of pigment to organic vinylic filler material may be inorganic, e.g., a water soluble alkali metal silicate or a water soluble titanium compound for example, titanium tetrachloride or oxychloride. Alternatively, they may be organic condensation resin such as an aminoplast or a phenoplast, which may be formed in situ by sequential addition of aqueous solutions or reactants for forming such resins. By reactants which form aminoplastics or aminoplasts we mean urea, melamine, thiourea and guanidine, etc., condensed with formaldehyde, glyoxal, etc. By reactants to form phenoplasts we mean phenol and/or substituted phenolic alcohols such as the cresols, xylenols and/or resorcinol, etc., condensable with formaldehyde and/or higher aldehydes such as glyoxal or furfural, etc. We use the term phenoplasts in the same manner as used by T. S. Carswell in his book entitled "Phenoplasts. Their Structure, Properties and Chemical Technology," published in 1947 by Interscience Publishers, Inc., New York, N.Y. We use the term aminoplastics in the same manner that C. P. Vale uses this term in his book entitled, "Aminoplastics," published in 1950 by Cleaver-Hume Press, Ltd., London, England.

Also the water soluble organo-silane compounds, e.g. Z6020 Silane available from Dow Chemical Company may be used.

Bonding agents which may be used to aid the substantivity of the organic or inorganic pigment material to the vinylic filler by chemical bonding include aqueous solutions or dispersions of organic polymers depositable on the pigment material and containing carboxy, amine, sulfate, and/or sulfonic acid groups, salts thereof, nitrogenous containing material such as oleophilic amines, oleophilic imines, oleophilic amine carboxylates, oleophilic quaternary ammonium compounds, water soluble polyamines, water soluble imines and combinations thereof may also be used.

(12) Coagulant

By coagulant we mean any additive capable of destabilizing the pigment/vinylic filler system under consideration, for causing coagulation of its solids content; the coagulant used will of course vary depending largely on the type of system, i.e. the type of surfactant used and/or the functionality, if any, of the vinylic filler polymer. For example, anionic systems may be coagulated with either acids such as acetic or formic, hydrochloric, sulfuric, alkaline-earth metal salts, zinc and aluminum and other colorless ions of heavy metals, water soluble alcohols, or water insoluble amines preferably as their water soluble salts. Cationic systems may be coagulated with water insoluble acids, preferably as the water soluble alkali metal salts thereof and/or the water soluble amines thereof, and ammonium hydroxide or water soluble alcohols. Nonionic systems are often coagulated with water soluble alcohols with or without the addition of acids. Anionic latices of vinylic filler pigment may also be coagulated by combining therewith cationic latices or substrate material surfaced with cationic polymer, and vice versa.

(13) Soft Powdering Agent(s)

The term soft powdering agent(s) or additive(s) as used herein connotes materials selected from the class consisting of aliphatic, cycloaliphatic and aromatic hydrocarbons and their alcohols having boiling points between 90° C. and 200° C. preferably the predominantly aliphatic hydrocarbon solvents of this class such as Solvent Naphtha and Stoddard Solvent. Naphtha Solvent, or Solvent Naphtha, is a mixture of low boiling hydrocarbons having a boiling point range of 90°–165° C. obtained in the distillation of coal tar, petroleum or shale oil, and may contain appreciable portions of benzene or its homologues. Stoddard Solvent is a petroleum distillate with minimum flash point of 100° F., 90% distillable at 375° F. with an end point of 410° F.

In accordance with this invention, said hydrocarbon systems are preferably applied in conjunction with an oil-soluble surface active agent. The oil-soluble surface active agent is selected from the class of materials extensively defined by Schwartz, Perry and Berch in their book Surface Active Agents and Detergents, Vol. II, Interscience Publishers, Inc., New York (1958), especially at pages 244–247 and pages 597–605. So useful surface active agents include the dialkyl sulfosuccinates, the mahogany sulfonates, dialkyl naphthalene sulfonic acids, esters of higher fatty acids, higher amine salts of naphthalene sulfonic acids, lanolin, lanolin fatty acids, naphthenic acids and their salts, glycol ethers, acyclic alcohols and keto alcohols, fatty alkylol amides and the sorbitan polyethenoxy sorbitan nonionics.

(14) Soft Powder Products

The terms "soft powder" or "soft powdered" vinylic filler pigment as applied to products producible by the present invention connotes the physical characteristic resulting from the treatment herein disclosed of the aqueously wet, never previously dried, vinylic filler pigment with the aforesaid soft powdering agent(s) before drying the same to a soft pigment product, i.e. the characteristic that the soft powdered dried vinylic filler pigment products have such a soft form that they are in or readily reduced to fine soft powder, without any extended attrition and are much more readily dispersible in any medium in which they may be utilized than vinylic filler pigment products not so treated. The mechanism accounting for this characteristic is not clearly understood, but it is believed that the hydrocarbon components of the soft powdering additives, which are carried on to the surfaces of the vinylic filler pigment particles by means of the oil soluble surfactant components thereof subsequently removed in the wash water, inhibit hydrogen bridging between the vinylic filler pigment particles by occupying the sites at which such could occur until after the elimination from the system of the aqueous phase, and thereafter are substantially removable at a more elevated temperature when their presences are not desired in the soft powdered product.

By way of illustrating the scope and practice of this invention the following examples are given in detailed step-wise procedural form.

EXAMPLE 1

To a sand-grinding apparatus was charged 100 grams of Heliogen Blue BG presscake, Pigment Blue 15, CI No.74160 containing 35% pigment solids, 5 grams of Tamol 731 (sodium salt of a polymeric carboxylic acid) and 2 grams of Tamol SN (sodium salt of a condensed naphthalene sulfuric acid) together with 100 grams of water. The pigment charge was milled for 5 hours, when a representative sample under microscopic examination showed essentially all of the pigment particles to be below 0.5 micron in diameter. The pigment dispersion was separated from the grinding medium (sand) by screening, the sand being washed color free with 200 grams of water.

This color pigment dispersion was then charged with stirring to a reaction vessel containing 266 grams of vinylic filler latex type 1-B and 1000 grams of water at 28° C. After stirring for 10 minutes, 20 grams of acetic acid as a 10% solution was run in slowly, followed by 40 ml. of a 10% solution of diamyl sodium sulfosuccinate in Solvesso 140. Baffles were then introduced into the reaction vessel and the bright blue vinylic filler pigment heated during one hour to 75°–80° C. and held at this temperature for 4 hours. On filtering, washing and oven drying 105 grams of a bright blue vinylic filler pigment in soft powder form was obtained which dispersed readily in thermoplastic materials without further grinding to give a bright clear blue, of excellent transparency, free from specks and cloudiness.

EXAMPLE 2

The procedure of Example 1 was repeated with the exception that in place of the Pigment Blue 15 presscake, was used 30 grams of Monastral Red B, Pigment Violet 19, CI. No. 46500 and the milling period in the sand grinder was extended to 20 hours. A bright bluish red vinylic filler pigment was obtained exhibiting the excellent dispersibility and tinctorial brightness characteristic of the process.

EXAMPLE 3

To a ball mill was charged 40 grams of Irgazin Yellow 2GLT, Pigment Yellow 109 and 33 grams of Heliogen Green A presscake, Pigment Green 7, CI No.74260 containing 30% pigment solids together with 200 grams of water, 1 gram of Tamol SN (sodium salt of a condensed naphthalene sulfonic acid) and 5 grams of Duponol ME (sodium lauryl sulfate). The charge was ball milled for 48 hours, separated from the milling apparatus and charged to a reaction vessel containing 730 grams of vinylic filler latex Type I-J at 28° C. After stirring 10 minutes the pH was adjusted to 10–10.5 with 50 ml. of a 20% solution of sodium hydroxide, and then heated to 50° C. during 1 hour to effect complete precipitation of the yellow green vinylic filler pigment. Microscopic examination of a sample at this point showed no evidence of separation of either of the two pigment components or the vinylic substrate material. 40 ml. of a 10% solution of sorbitan monolaurate in Solvent Naphtha were added, baffles put in to increase the agitation and the temperature raised to 80° C. during 2 hours and held at between 80° and 85° C. for 5 hours. On filtering, washing and oven drying the product, 150 grams of a bright green soft powdered vinylic filler pigment was obtained which showed no tendency to separate into the component pigments on use and required no grinding to be immediately suitable for incorporation into thermoplastic systems, nor did prolonged exposure to solvents cause any color bleed into same from said vinylic filler pigment.

EXAMPLE 4

The procedure of Example 3 was followed with the exception that in place of the Pigment Yellow 109 and the Pigment Green 7 was used 30 grams (dry basis) of Benzidine Yellow presscake, Pigment Yellow 12, CI No.21090 and 20 grams (dry basis) of Ponsol Jade Green presscake, Vat Green 1, CI. No.59825. A strong bright green vinylic filler pigment was obtained, which showed excellent color strength and light fastness when incorporated into oil based paint systems.

EXAMPLE 5

To a sand grinding apparatus was charged 50 grams of Perylene Red Toner, Pigment Red 123, CI No.71145, 10 grams of Alipal CO 433 and 4 grams of Duomac T (N-tallow triethylenediamine diacetate 85% active) together with 300 grams of water, and the charge milled for 48 hours, when microscopic examination of a representative sample showed essentially all of the color pigment particles to be below 0.2 micron in size. The color pigment dispersion was separated from the sand by screening and washing the latter with an equal volume of water and charged to a reaction vessel containing 736 grams of vinylic filler latex type I-H, at 28° C. 10 ml. of a 10% aqueous solution of Tetraethylenepentamine was added and then 50 ml. of a 20% solution of sulfuric acid added drop-wise during 20 minutes, causing precipitation of the bright red vinylic pigment. The reaction was heated to 40° C. with turbulent agitation and 30 ml. of a 10% solution of octylphenoxydimethoxyethanol in Solvesso 140 added, and the heating continued to 80° C. during a 2 hour period. The temperature was maintained at this level for 4–5 hours, following which the bright red vinylic filler pigment was filtered and washed. The presscake product was reslurried in 700 ml. of water and spray dried to give 150 grams of a bright red soft powdered vinylic filler pigment in particulate form which required no further grinding to be suitable for incorporation into thermoplastic or oil based systems.

EXAMPLE 6

The procedure of Example 5 was followed with the exception that in place of Pigment Red 123 was used 25 grams of Amaplast Red FFB, Vat Red 1 CI No.73360 and 25 grams of Irgazin Yellow 3RLt, Pigment Yellow 110. A bright orange red vinylic pigment was obtained.

EXAMPLE 7

The procedure of Example 1 was followed with the exception that prior to acidification of the vinylic pigment dispersion was added 10 grams of Urea dissolved in 50 ml. of water, followed by 25 ml. of aqueous formaldehyde (35% active). The vinylic filler pigment so formed contained incorporated therein the aminoplastic condensation resin product thereof which, when the product is utilized in a textile printing composition aid in binding the vinylic pigment to the fiber substrate on curing.

EXAMPLE 8

The procedure of Example 5 was followed with the exception that 10 grams of Polyethylenimine PEI 18, manufactured by Dow Chemical Co., was added prior to the acidification step. The vinylic pigment so produced contained polytheylenimine material incorporated therein and was found to have enhanced affinity for cellulosic material when used to pigment or color same.

EXAMPLE 9

To a ball mill was charged 10 grams of Titanium Dioxide Pigment, Pigment White 6, CI No. 77891, 40 grams of Silica Pigment, Pigment White 27, CI No. 77811, 20 grams of Duomac T, N-tallow trimethylenediamine diacetate, 10 ml. of acetic acid, and 300 ml. of water. The charge was milled for 48 hours, when microscopic examination of a representative sample revealed essentially no pigment particle above 0.2 micron in diameter. The pigment dispersion was separated from the grinding medium and charged to a reaction vessel equipped with apparatus for creating turbulent agitation, containing therein 400 grams of vinylic filler latex type I-A at 28°–30° C. After stirring 10 minutes 400 ml. of isopropyl alcohol was run in to coagulate the vinylic filler pigment product and the charge heated to 70° C. during 1 hour. After 3 hours stirring at this temperature precipitation of the inorganic pigment material onto the vinylic filler particles was complete and the product was filtered, washed and dried. A yield of 150 grams of a soft opaque white pigment was obtained, which mixed readily with oil based vehicles and dispersed in thermoplastic resins with a minimum of physical grinding. The opacity and whiteness of the product approached that obtained from a pure titanium dioxide pigment.

EXAMPLE 10

To a ball mill was charged 40 grams of Cadmium Red Pigment, Pigment Red 108, CI No. 77196 and 10 grams of Oil Red OB, Solvent Red 26, CI No. 26120 together with 10 grams of Tanaphen A 600, (modified phenolic amphoteric surface active agent 50% active) and 300 grams of water. The pigments were milled for 24 hours when a representative sample showed essentially all pigment particles to be below 0.5 micron in diameter. The pigment dispersion was separated from the grinding medium and charged to a reaction vessel equipped as in the previous example containing 400 grams of vinylic filler latex type I-B. After stirring for 10 minutes the charge was acidified to a pH of 5.0–5.5 with acetic acid whereupon the pigment color precipitated onto the surface of the coagulated vinylic filler particles. 30 ml. of a 20% solution of a dioctyl ester of sodium sulfosuccinic acid in Solvesso 140 were added and the reaction heated during 1 hour to 75° C. and held at this temperature for 4 hours. A deep red vinylic filler pigment was obtained which was filtered and washed without any evidence of color bleeding off the organic substrate particles. On oven drying an extremely soft vinylic pigment was obtained which possessed excellent light fastness and tinctorial strength.

EXAMPLE 11

140 grams of Heliogen Blue BG 100% dry basis, Pigment Blue 15, CI No. 74160, was charged as presscake to a sand grinding apparatus together with 10 grams of Oil Blue A, Solvent Blue 36, 5 grams of Tamol 731, (sodium salt of a polymeric carboxylic acid) 2 grams of Tamol SN (sodium salt of a condensed naphthalene sulfonic acid) and 1 gram of Duponol ME (sodium lauryl sulfate). The charge was milled until a representative sample under microscopic examination showed essentially all of the pigment particles to be below 0.2 micron in diameter. The pigment dispersion was separated from the grinding apparatus and charged to a reaction vessel equipped as in the preceding examples containing 400 grams of vinylic filler latex type I-B, at 28° C. After stirring for 10 minutes, 30 ml. of a 15% solution of di-tertiary-octyl sodium sulfosuccinate in Solvesso 140 was added followed by 50 ml. of acetic acid to coagulate the product. The temperature was raised to 75°–80° C. during 2 hours and held at this range for 4 hours. A very bright strong blue vinylic pigment was obtained which showed no evidence of color bleeding when the aqueous phase was separated by filtration and washing. The product was oven dried to yield 260 grams of soft powdered blue vinylic filler pigment.

EXAMPLE 12

40 grams of Carbozole Violet, dry basis, Pigment Violet 23, CI No. 51317, as presscake were charged to a sand grinding apparatus together with 26 grams of a styrene/methacrylic acid/acrylonitrile copolymer, (ratio 25/65/10) as the ammonium salt, and 200 grams of water. The charge was milled for 24 hours, when microscopic examination of a representative sample showed essentially all of the pigment particles to be below 0.2 micron in diameter. The color dispersion was separated from the grinding apparatus and charged to a reaction vessel equipped as in the preceding Examples containing 400 grams of vinlyic filler latex type I-G. The vinylic pigment precipitated during the addition which was carried out using rapid agitation to ensure complete mixing of the ingredients. The product was stirred for 10 minutes and then heated to 70° C. and held at that temperature for 2 hours. The product was then filtered and washed and retained as presscake for use in aqueous based systems.

EXAMPLE 13

This Example was made as in the preceding Example with the exception that prior to heating the vinlyic filler pigment slurry, 30 grams of a 20% solution of polyethylene sorbitan monolaurate in Stoddard Solvent was added, and the heating continued for a total of 4 hours. The product was filtered, washed and dried to yield 160 grams of a soft powdered deep violet vinylic filler pigment suitable for use in thermoplastic and oil based systems.

EXAMPLE 14

The procedure used in Example 13 was followed with the exception that in place of the Carbazole Violet, Pigment Violet 23 was used 20 grams of Victoria Blue, Pigment Blue 1, CI No. 42595. A very strong bright blue soft powdered vinylic pigment was obtained suitable for use in thermoplastic and oil based systems.

EXAMPLE 15

To a sand grinding apparatus was chrged 100 grams of Heliogen Green A presscake, Pigment Green 7, CI No. 74260 containing 33% pigment solids, 17 grams of Irgazin Yellow 3GLT, Pigment Yellow 110, 50 grams of 20% solution of a copolymer of styrene, methacrylic acid and acrylonitrile (ratio 25/65/10) as the ammonium salt, 2 grams of Duponol ME (sodium lauryl sulfate, 2 grams of Z6020 Silane (Organo Silane manufactured by Dow), 10 grams of 28% aqueous ammonium hydroxide, 125 ml. of water and sufficient Ottawa sand as the grinding medium to mill the charge. The pigment charge was milled for 17 hours when a representative sample under microscopic examination showed essentially all of the organic color pigment material to be below 0.2 micron in diameter. The pigment dispersion was separated from the grinding medium (sand) by screening, the sand being washed color free with 20 ml. of water. This color pigment dispersion was then charged with stirring to a reaction vessel, equipped with temperature controls and baffles for inducing turbulent agitation, containing 500 grams of vinylic filler latex type I-B and 1000 ml. of water at 28° C. After stirring for 15 minutes 50 grams of glacial acetic acid as a 20% aqueous solution were slowly run in to coagulate the vinlyic filler latex and simultaneously precipitate the bright green organic pigment dispersion onto the particulate entities thereof.

The slurry was stirred for 10 minutes and 40 ml. of a 20% solution of a dioctyl ester of sodium sulfosuccinic acid dissolved in Solvent Naphtha, run in. The agitated slurry was then heated to 80° C. during 1 hour and held at this temperature for 5 hours. The bright green coagulum was separated from the serum by filtration, washed acid free with water and dried in a convection type oven to yield 200 grams of a very soft bright green intensely colored vinylic filler pigment which dispersed readily into thermoplastic and oil based systems without further grinding.

EXAMPLE 16

The procedure of Example 15 was followed with the exception that in place of the 2 grams of Z6020 Silane was added 10 grams of urea and 30 grams of formaldehyde as a 30% aqueous solution, and the milling time was extended to 20 hours.

The vinylic filler pigment so produced contained reactive aminoplast material therewith, which could be further cross-linked by conventional treatments, e.g. heat to aid in the fixation of the vinylic filler pigment to substrate materials e.g. woven and non-woven synthetic and natural fiber.

EXAMPLE 17

The procedure of Example 9 was followed with the exception that the inorganic pigment material used consisted of 50 grams of HiSil 404, a paper grade precipitated silica pigment manufactured by PPG Industries.

The vinylic filler pigment so produced was extremely soft and readily dispersed into oil based and thermoplastic systems without additional grinding.

EXAMPLE 18

The procedure of Example 9 was followed with the exception that the inorganic pigment material used consisted of 50 grams of Titanium Dioxide pigment, Pigment White 6, CI. No. 77891, and to the grinding step was also added 3 grams of Z6020 Silane (organo silane manufactured by Dow). The coagulated slurry was isolated by filtration and washing the coagulum salt free, and the so obtained presscake reslurried in sufficient water to give a 20% solids content and then spray dried.

A soft powdery particulate intensely white vinylic filler pigment was obtained which required no further treatment to be readily incorporated into oil based and thermoplastic systems.

EXAMPLE 19

The procedure of Example 1 was followed with the exception that the 100 grams of Heliogen Blue BG (35% solids) was replaced with 2 grams of Victoria Blue, Pigment Blue 1, (CI No. 42595). A pale blue soft powdered pigment was obtained suitable for tinting paper products.

EXAMPLE 20

The procedure of Example 1 was followed with the exception that in place of the 266 grams of vinylic filler latex type I-B was used 266 grams of vinylic filler latex type II-B to yield a product having identical characteristics.

EXAMPLE 21

The procedure of Example 3 was followed with the exception that in place of the 730 grams of vinylic filler latex type I-J was used 730 grams of vinylic filler latex type II-J to yield a product with similar excellent pigmentary characteristics.

EXAMPLE 22

The procedure of Example 5 was followed with the exception that in place of the 736 grams of vinylic filler latex type I-H was used 736 grams of vinylic filler latex type II-H to yield a product with the same excellent pigmentary characteristics.

EXAMPLE 23

The procedure of Example 12 was followed with the exception that in place of the 400 grams of vinylic filler type I-G latex was used 334 grams of graft vinylic filler latex type III-B to yield a product with the same excellent pigmentary characteristics.

The following Examples are given in Tabular form to further illustrate the scope and practice of this invention. In these Examples, parts given are in grams; the heating in the vinylic pigmentation method (step 10) is effected by means of external heating, e.g. with a gas burner or electric hot plate, and the coagulation method (step 13) indicates the adjusting of the pH of the reaction to either 4–5 when acid is indicated or 9–10 where alkali is indicated. The acid or alkali used is not critical and can be any conveniently available commercial product and may be used either separately or in any combination desired. Among the acids that can be used are organic acids such as aqueous acetic, formic or hydroxy acetic; or inorganic acids such as aqueous hydrochloric, sulfuric or phosphoric. The alkali containing material may similarly be either organic (e.g. aqueous ammonia) or inorganic (e.g. sodium hydroxide or potassium hydroxide). When alcohol is used, it refers to commercial grade isopropyl alcohol, although any of the lower alcohols e.g. methanol, ethanol, etc. may be substituted provided they are water soluble.

In all cases where the soft powdered product is isolated by spray drying the coagulant used is either a volatile organic material, e.g. acetic acid, ammonium hydroxide or isopropyl alcohol; or the coagulant may be a nonvolatile acid or base e.g. sulfuric acid or sodium hydroxide provided the vinylic pigment product so coagulated is filtered and washed free of water soluble electrolytes to form a salt free essentially neutral presscake, that is then reslurried in sufficient water to provide an aqueous slurry containing between 10 and 20% pigment solids by weight, which is spray dried to yield the vinylic pigment product in particulate spray dried form.

TABLE IV

Preparation of Improved Colored Vinylic Filler Having the Coloring Pigment Bonded to the Surface Area of the Preformed Polymeric Particle

| Example No. IV- | 1 | 2 | 3 | 4 | 5 |
|---|---|---|---|---|---|
| A. Micronizing Step | | | | | |
| 1. Pigment or Dye | Pigment | Pigment | Pigment | Pigment | Pigment |
| Color Class | Phthalo | Phthalo | Phthalo | Phthalo | Phthalo |
| Trade Name | Heliogen | Heliogen | Heliogen | Polymo Sky | Phthalo |

TABLE IV-continued
Preparation of Improved Colored Vinylic Filler Having the Coloring Pigment Bonded to the Surface Area of the Preformed Polymeric Particle

|  | Blue BC Pig.Blue 15 | Green A Pig. Green 7 | Blue G Pig. Blue 16 | Blue G Pig. Green 37 | Green Y Pig. Green 36 |
|---|---|---|---|---|---|
| Color Index Name | | | | | |
| Color Index Number | 74160 | 74260 | 74100 | 74255 | 74160 |
| Quantity; Parts, dry basis | 40 | 40 | 50 | 40 | 50 |
| 2. Dispersant Type; (anionic; nonionic; cationic; amphoteric ester; polymeric) | anionic | nonionic | cationic | anionic + polymeric | nonionic + amphoteric |
| Trade name | Alipal CO 433 | Triton X405 | Duomeen T | Duponol ME + Tamol 731 | Triton X405 + Tanaphen A-600 |
| Quantity, Parts, 100% active | 20 | 10 | 10 | 2 + 8 | 10 + 10 |
| 3 Water, quantity, parts | 200 | 200 | 250 | 200 | 250 |
| 4. Micronizing Method; (Sand Milling, Ball Milling, other) | Sand | Ball | Sand | Ball | Sand |
| Sand, Parts | 300 | | 300 | | 300 |
| Time, hours | 24 | 48 | 24 | 48 | 24 |
| Temperature, ° C. | 28 | 28 | 28 | 28 | 28 |
| 5. Separation, Pigment & Micronizing media, - Screening (X) | X | X | X | X | X |
| Wash Water, Parts | 140 | 150 | 140 | 150 | 130 |
| 6. Yield, Aqueous Pigment Dispersion Parts, Approx. | 400 | 400 | 450 | 400 | 450 |
| B. Pigmentation Step | | | | | |
| 7 Vinylic Filler Emulsion Composition Type Used | I-A | I-C | I-F | I-E | I-B |
| 8. Vinylic Filler Emulsion Parts | 500 | 500 | 400 | 500 | 500 |
| 9. Vinylic Filler Emulsion % Solids | 25.7 | 18.2 | 26.9 | 25.8 | 26.8 |
| 9A. Water, Dilution | 1000 | 1000 | 800 | 1000 | 800 |
| 10. Bonding Components Heating (X) | X | X | X | X | X |
| Time, Hours | 5 | 5 | 4 | 4 | 5 |
| Temperature, ° C. | 80 | 80 | 80 | 80 | 80 |
| 11. Nitrogenous Material Parts | 10[1] | 5[4] | — | 10[1] | 5[3] |
| 11A. Pigment Bonding Agent Material, Parts | — | — | — | 20[8] | — |
| 11B. Soft Powdering Additive, Parts | 20[a] | 30[b] | 30[d] | 20[a] | 30[f] |
| 12. Approximate Volume | 2000 | 2000 | 2000 | 2000 | 1800 |
| 13. Coagulation Method | Alkali | Alcohol | Alkali | Acid | Alcohol |
| 14. Isolation Method, Spray Dry (S) | — | — | — | (S) | — |
| Filtration (X) | X | X | X | — | X |
| 15. Yield, Dry Vinylic Filler Color Pigment, Approx. | 168 | 130 | 160 | 190 | 185 |
| Example Number IV- | 6 | 7 | 8 | 9 | 10 |

| A. Micronizing Step | | | | | |
|---|---|---|---|---|---|
| 1. Pigment or Dye Color Class | Pigment Quin. | Pigment Quin. | Pigment Quin. | Pigment Quin. | Pigment Quin. |
| Trade Name | Quinacridone Red B | Quinacridone Red B | Quinacridone Magenta | Brilliant Red 5 BL | Brilliant Red 5 BL |
| Color Index Name | Pigment Violet 19 | Pigment Violet 19 | Pigment Red 122 | Pigment Red 192 | Pigment Red 192 |
| Color Index Number | 46500 | 46500 | — | — | — |
| Quantity; Parts, dry basis | 50 | 50 | 50 | 50 | 50 |
| 2. Dispersant Type; (Anionic, nonionic, cationic, Amphoteric, ester, polymeric) | anionic | nonionic | cationic | anionic + polymeric | nonionic + amphoteric |
| Trade Name | Alipal CO 433 | Triton X305 | Duomac T | Duponol ME + Tamol 731 | Triton X305 + Sulfobetaines OD |
| Quantity, Parts, 100% active | 20 | 15 | 10 | 2 + 8 | 10 + 10 |
| 3. Water, Quantity, Parts | 200 | 200 | 200 | 200 | 200 |
| Tamol SN | 1 | 1 | — | 1 | 1 |
| Zonyl FSC | — | — | 1 | — | — |
| 4. Micronizing Method; (sand milling, ball milling, other) | Sand | Sand | Sand | Ball | Sand |
| Sand, Parts | 300 | 300 | 300 | 300 | 300 |
| Time, hours | 10 | 10 | 10 | 20 | 10 |
| Temperature, ° C. | 28 | 28 | 28 | 28 | 28 |
| 5. Separation; Pigment & Micronizing Media - Screening (X) | X | X | X | X | X |
| Wash Water, Parts | 129 | 134 | 139 | 139 | 129 |
| 6. Yield, Aqueous Pigment Dispersion, parts | 400 | 400 | 400 | 400 | 400 |
| B. Pigmentation Step | | | | | |
| 7. Vinylic Filler Emulsion Composition Type Used | I-B | I-C | I-E | I-G | I-D |
| 8. Vinylic Filler Emulsion Parts | 400 | 700 | 500 | 400 | 400 |
| 9. Vinylic Filler Emulsion % Solids | 26.8 | 18.2 | 25.8 | 26.9 | 26.4 |
| 9A. Water, Dilution | 1000 | 1000 | 1000 | 1000 | 1000 |
| 10. Bonding Components Heating (X) | X | X | X | X | X |
| Time, hours | 5 | 5 | 5 | 5 | 5 |
| Temperature, ° C. | 80 | 80 | 80 | 80 | 80 |
| 11. Nitrogenous Material | 10[1] | 5[7] | — | 4[2] | 4[6] |

TABLE IV-continued
Preparation of Improved Colored Vinylic Filler Having the Coloring Pigment Bonded to the Surface Area of the Preformed Polymeric Particle

| | | | | | |
|---|---|---|---|---|---|
| 11A. Pigment Bonding Agent Material | — | — | — | 10[9] | — |
| 11B. Soft Powdering Additive, Parts | 20[a] | 20[g] | 30[c] | 30[d] | 20[f] |
| 12. Approximate Volume | 1800 | 2200 | 2000 | 1800 | 1800 |
| 13. Coagulation Method | Alkali | Alcohol | Alkali | Acid | Alcohol |
| 14. Isolation Method, Spray Dry (S) | — | — | — | S | — |
|     Filtration (X) | X | X | X | — | X |
| 15. Yield, Dry Vinylic Filler Color Pigment, Approx. | 160 | 180 | 180 | 180 | 160 |
| Example Number IV- | 11 | 12 | 13 | 14 | 15 |

| | | | | | |
|---|---|---|---|---|---|
| A. Micronizing Step | | | | | |
| 1. Pigment or Dye | Pigment | Pigment | Pigment | Pigment | Pigment |
|   Color Class | AZA | AZA | AZA | AZA | AZA |
|   Trade Name | Irgazin Yellow 3 RLT | Irgazin Yellow 2 GLT | Irgazin Orange RLT | Irgazin Red 2 BLT | Irgazin Yellow 3 RLT |
|   Color Index Name | Pigment Yellow 110 | Pigment Yellow 109 | Pigment Orange 42 | Pigment Red 180 | Pigment Yellow 110 |
|   Color Index Number | — | — | — | — | — |
|   Quantity, Parts, Dry Basis | 50 | 50 | 50 | 50 | 50 |
| 2. Dispersant Type; (anionic, nonionic, cationic, amphoteric, ester, polymeric) | anionic | nonionic | cationic | amphoteric | ester |
|   Trade Name | Santomerse ME | Igepal CO 997 | Armac T | Deriphat 154 | Triton XQS 20 |
|   Quantity, Parts, 100% active | 20 | 10 | 15 | 20 | 10 |
| 3. Water, Quantity, Parts | 200 | 200 | 200 | 200 | 200 |
|   Zonyl FSA | 1 | — | — | — | — |
| 4. Micronizing Method; (Sand Milling, Ball Milling, Other) | Sand | Ball | Ball | Sand | Sand |
|   Sand, Parts | 300 | | | 300 | 300 |
|   Time, hours | 24 | 48 | 48 | 24 | 24 |
|   Temperature, °C. | 28 | 28 | 28 | 28 | 28 |
| 5. Separation; Pigment & Micronizing Media - Screening (X) | X | X | X | X | X |
|   Wash Water, Parts | 130 | 140 | 135 | 130 | 140 |
| 6. Yield, Aqueous Pigment Dispersion, Parts | 400 | 400 | 400 | 400 | 400 |
| B. Pigmentation Step | | | | | |
| 7. Vinylic Filler Emulsion Composition Type Used | I-H | I-K | I-L | I-J | I-C |
| 8. Vinylic Filler Emulsion, Parts | 800 | 800 | 700 | 800 | 600 |
| 9. Vinylic Filler Emulsion, % Solids | 13.6 | 14.0 | 15.6 | 13.7 | 18.2 |
| 9A. Water, Dilution | 1000 | 1000 | 1000 | 1000 | 1000 |
| 10. Bonding Components Heating (X) | X | X | X | X | X |
|   Time, Hours | 5 | 4 | 5 | 5 | 4 |
|   Temperature, °C. | 80 | 80 | 80 | 80 | 80 |
| 11. Nitrogenous Material, Parts | 10[1] | 10[1] | — | — | — |
| 11A. Pigment Bonding Agent Material, Parts | 10[10] | — | — | 10[11] | — |
| 11B. Soft Powdering Additive, Parts | 20[e] | 20[g] | 20[a] | 20[e] | 30[b] |
| 12. Approximate Volume | 2200 | 2200 | 2100 | 2200 | 2000 |
| 13. Coagulation Method | Acid | Alcohol | Alkali | Acid | Alcohol |
| 14. Isolation Method. Spray Dry (S) | — | S | — | S | — |
|   Filtration (X) | X | — | X | — | X |
| 15. Yield, Dry Vinylic Filler Color Pigment, approx. | 160 | 172 | 160 | 190 | 160 |
| Example Number IV- | 16 | 17 | 18 | 19 | 20 |

| | | | | | |
|---|---|---|---|---|---|
| A. Micronizing Step | | | | | |
| 1. Pigment or Dye | Pigment | Pigment | Pigment | Pigment | Pigment |
|   Color Class | Diox | Diox | Diox | Diox | Diox |
|   Trade Name | Irgazin Violet 6RLT (3) | Carbazole Violet R | Irgazin Violet BLT (3) | Chromophtal Violet B (3) | Heliogen Violet R |
|   Color Index Name | | Pigment Violet 23 | | | Pigment Violet 23 |
|   Color Index Number | — | 51319 | — | — | 51319 |
|   Quantity, Parts, Dry Basis | 50 | 50 | 50 | 50 | 50 |
| 2. Dispersant Type; (anionic, nonionic, cationic, amphoteric, ester, polymeric) | anionic | nonionic | cationic | amphoteric | polymeric |
|   Trade Name | Aerosol 22 | Igepal CA 897 | Monoquat TIBC | Sulfobetaine DC | Tamol 731 |
|   Quantity, Parts, 100% active | 5 | 5 | 10 | 10 | 5 |
| 3. Water, Quantity, Parts | 200 | 200 | 200 | 200 | 200 |
|   Zonyl FSC | — | — | 1 | — | — |
|   Tamol SN | 1 | 1 | — | 1 | 1 |
| 4. Micronizing Method; (sand milling, ball milling, other) | Sand | Sand | Sand | Sand | Sand |
|   Sand, Parts | 300 | 300 | 300 | 300 | 300 |
|   Time, Hours | 10 | 10 | 10 | 10 | 10 |
|   Temperature, °C. | 28 | 28 | 28 | 28 | 28 |
| 5. Separation; Pigment & Micronizing Media - Screening (X) | X | X | X | X | X |
|   Wash Water, Parts | 144 | 144 | 139 | 139 | 144 |
| 6. Yield, Aqueous Pigment Dispersion, Parts | 400 | 400 | 400 | 400 | 400 |

TABLE IV-continued
Preparation of Improved Colored Vinylic Filler Having the Coloring Pigment Bonded to the Surface Area of the Preformed Polymeric Particle

| | | | | | |
|---|---|---|---|---|---|
| B. Pigmentation Step | | | | | |
| 7. Vinylic Filler Emulsion Composition Type Used | I-A | I-F | I-F | I-H | I-L |
| 8. Vinylic Filler Emulsion Parts | 500 | 400 | 400 | 800 | 700 |
| 9. Vinylic Filler Emulsion % Solids | 25.7 | 26.9 | 26.9 | 13.6 | 15.6 |
| 9A. Water, Dilution | 800 | 1000 | 800 | 1000 | 1000 |
| 10. Bonding Components Heating (X) | X | X | X | X | X |
| Time, hours | 5 | 5 | 5 | 4 | 4 |
| Temperature, °C. | 80 | 80 | 80 | 80 | 80 |
| 11. Nitrogenous Material, Parts | — | $10^1$ | — | — | — |
| 11A. Pigment Bonding Agent Materials, Parts | $2^{14}$ | — | — | $2^{14}$ | $10^{12}$ |
| 11B. Soft Powdering Additive, Parts | $25^a$ | $30^f$ | $35^c$ | $40^c$ | $20^a$ |
| 12. Approximate Volume | 1800 | 1800 | 1600 | 2200 | 2100 |
| 13. Coagulation Method | Acid | Alcohol | Alkali | Acid | Acid |
| 14. Isolation Method Spray Drying (S) | — | — | — | S | — |
| Filtration (X) | X | X | X | — | X |
| 15. Yield, Dry Vinylic Filler Color Pigment, approx. | 180 | 160 | 160 | 170 | 160 |
| Example Number IV- | 21 | 22 | 23 | 24 | 25 |
| A. Micronizing Step | | | | | |
| 1. Pigment or Dye Color Class | Pigment AZO | Pigment AZO | Pigment AZO | Pigment AZO | Pigment AZO |
| Trade Name | Hansa Yellow G | Hansa Yellow/OG | Hansa Yellow 3R | Benzidine Yellow | Permanent Carmine FB |
| Color Index Name | Pigment Yellow 1 | Pigment Yellow 3 | Pigment Orange 1 | Pigment Yellow 12 | Pigment Red 5 |
| Color Index Number | 11680 | 11710 | 11725 | 21090 | 12490 |
| Quantity, Parts, Dry Basis | 50 | 50 | 50 | 50 | 50 |
| 2. Dispersant Type; (anionic, nonionic, cationic, amphoteric, ester, polymeric) | anionic | nonionic | cationic | amphoteric | ester |
| Trade Name | GAFAX RE870 | Triton X 405 | Monazoline T | Tanaphen A 600 | Triton QS 44 |
| Quantity, Parts, 100% active | 10 | 10 | 10 | 15 | 10 |
| 3. Water, Quantity, Parts | 200 | 200 | 200 | 200 | 200 |
| Tamol SN | 2 | — | — | 2 | 2 |
| Zonyl FSN | — | 1 | — | — | — |
| 4. Micronizing Method; (Sand Milling, Ball milling, other) | Sand | Sand | Ball | Ball | Sand |
| Sand, Parts | 300 | 300 | — | — | 300 |
| Time, hours | 10 | 10 | 24 | 24 | 10 |
| Temperature, °C. | 28 | 28 | 28 | 28 | 28 |
| 5. Separation; Pigment & Micronizing Media - Screening (X) | X | X | X | X | X |
| Wash Water, Parts | 138 | 138 | 138 | 133 | 138 |
| 6. Yield, Aqueous Pigment Dispersion, Parts | 400 | 400 | 400 | 400 | 400 |
| B. Pigmentation Step | | | | | |
| 7. Vinylic Filler Emulsion Composition Type Used | I-C | I-J | I-H | I-E | I-G |
| 8. Vinylic Filler Emulsion, Parts | 600 | 800 | 800 | 500 | 400 |
| 9. Vinylic Filler Emulsion % Solids | 18.2 | 13.7 | 13.6 | 25.8 | 26.9 |
| 9A. Water, Dilution | 800 | 800 | 800 | 1000 | 1200 |
| 10. Bonding Components Heating (X) | X | X | X | X | X |
| Time, hours | 5 | 4 | 5 | 5 | 4 |
| Temperature, °C. | 80 | 80 | 80 | 80 | 80 |
| 11. Nitrogenous Material, Parts | $4^6$ | $10^1$ | — | — | — |
| 11A. Pigment Bonding Agent Material, Parts | $2^{14}$ | — | — | $10^{11}$ | $10^{12}$ |
| 11B. Soft Powdering Additive, Parts | $35^b$ | $35^d$ | $30^e$ | $30^g$ | $25^a$ |
| 12. Approximate Volume | 1800 | 2000 | 2000 | 1900 | 2000 |
| 13. Coagulation Method | Acid | Alcohol | Alkali | Acid | Acid |
| 14. Isolation Meethod, Spray Dry (S) | — | — | — | S | — |
| Filtration (X) | X | X | X | — | X |
| 15. Yield, Dry Vinylic Filler Color Pigment, Approx. | 160 | 160 | 160 | 190 | 160 |
| Example Number IV- | 26 | 27 | 28 | 29 | 30 |
| A. Micronizing Step | | | | | |
| 1. Pigment or Dye Color Class | Pigment TPM | Pigment TPM | Pigment TPM | Pigment TPM | Pigment TPM |
| Trade Name | Rhodamine Y | Rhodamine B | Consol Green | Irgalite Violet TCR | Victoria Blue |
| Color Index Name | Pigment Red 81 | Pigment Violet 1 | Pigment Green 2 | Pigment Violet 3 | Pigment Blue 1 |
| Color Index Number | 45160 | 45170 | 42040 & 49010 | 42535 | 42595 |
| Quantity, Parts, Dry Basis | 30 | 30 | 30 | 30 | 30 |
| 2. Dispersant Type; (anionic, nonionic, cationic, amphoteric, ester, polymeric) | anionic | nonionic | cationic | amphoteric | polymeric |
| Trade Name | Alipal Co 433 | Triton X 305 | Duomac T | Monateric CY-Na | Tamol 731 |
| Quantity, Parts, 100% Active | 10 | 10 | 10 | 10 | 10 |

TABLE IV-continued
Preparation of Improved Colored Vinylic Filler Having the Coloring Pigment Bonded to the Surface Area of the Preformed Polymeric Particle

| | | | | | |
|---|---|---|---|---|---|
| 3. Water, Quantity, Parts | 200 | 200 | 200 | 200 | 200 |
| Zonyl FSB | — | — | — | 1 | 1 |
| 4. Micronizing Method; (Sand Milling, Ball Milling, Other) | Sand | Sand | Sand | Sand | Sand |
| Sand, Parts | 300 | 300 | 300 | 300 | 300 |
| Time, hours | 10 | 10 | 10 | 10 | 10 |
| Temperature, °C. | 28 | 28 | 28 | 28 | 28 |
| 5. Separation; Pigment & Micronizing Media - Screening (X) | X | X | X | X | X |
| Wash Water, Parts | 158 | 158 | 158 | 158 | 158 |
| 6. Yield, Aqueous Pigment Dispersion, Parts | 400 | 400 | 400 | 400 | 400 |
| B. Pigmentation Step | | | | | |
| 7. Vinylic Filler Emulsion Composition Type Used | II-B | II-B | II-F | II-H | II-L |
| 8. Vinylic Filler Emulsion, Parts | 500 | 500 | 500 | 800 | 800 |
| 9. Vinylic Filler Emulsion % Solids | 26.8 | 26.8 | 26.9 | 13.6 | 15.6 |
| 9A. Water, Dilution | 1000 | 1000 | 1000 | 800 | 1000 |
| 10. Bonding Components Heating (X) | X | X | X | X | X |
| Time, hours | 5 | 5 | 5 | 5 | 4 |
| Temperature, °C. | 80 | 80 | 80 | 80 | 80 |
| 11. Nitrogenous Material, Parts | — | — | — | — | $10^1$ |
| 11A. Pigment Bonding Agent Material Parts | $2^{14}$ | — | $10^{10}$ | $10^{11}$ | $6^{13}$ |
| 11B. Soft Powdering Additive, Parts | $35^f$ | $35^c$ | $30^a$ | $35^f$ | $30^g$ |
| 12. Approximate Volume | 1900 | 1900 | 1900 | 2000 | 2200 |
| 13. Coagulation Method | Acid | Acid | Acid | Acid | Acid |
| 14. Isolation Method, Spray Dry (S) | — | — | S | — | S |
| Filtration (X) | X | X | — | X | — |
| 15. Yield, Dry Vinylic Filler Color Pigment, Approx. | 165 | 165 | 180 | 140 | 165 |
| Example Number IV- | 31 | 32 | 33 | 34 | 35 |
| A. Micronizing Step | | | | | |
| 1. Pigment or Dye | Pigment | Pigment | Pigment | Pigment | Pigment |
| Color Class | Vat | Vat | Vat | Vat | Vat |
| Trade Name | Perylene Red | Indanthren Rubine R | Sandothrene Blue NCGD | Indanthren Brilliant Orange RK | Indanthren Red FBBA |
| Color Index Name | Vat Red | Vat Red | Vat Blue | Vat Orange | Vat Red |
| Color Index Number | 29 | 13 | 14 | 3 | 10 |
| | 71140 | 70320 | 69810 | 59300 | 67000 |
| Quantity, Parts, Dry Basis | 50 | 50 | 50 | 50 | 50 |
| 2. Dispersant Type - (anionic, nonionic, cationic, amphoteric, ester, polymeric) | anionic | nonionic | cationic | amphoteric | polymeric |
| Trade Name | Duponol ME | Igepal CO 997 | Monoquat TIBC | Uniterge K | Tamol 731 |
| Quantity, Parts, 100% active | 5 | 5 | 5 | 10 | 5 |
| 3. Water, Quantity, Parts | 200 | 200 | 200 | 200 | 200 |
| Tamol SN | — | — | — | 2 | 2 |
| Zonyl FSA | 1 | 1 | — | — | — |
| 4. Micronizing Method; (Sand Milling, Ball Milling, Other) | Sand | Ball | Sand | Ball | Sand |
| Sand, Parts | 300 | | 300 | | 300 |
| Time, hours | 10 | 24 | 10 | 24 | 10 |
| Temerature, °C. | 28 | 28 | 28 | 28 | 28 |
| 5. Separation, Pigment & Micronizing Media - Screening (X) | X | X | X | X | X |
| Wash Water, Parts | 143 | 143 | 143 | 138 | 143 |
| 6. Yield, Aqueous Pigment Dispersion, Parts | 400 | 400 | 400 | 400 | 400 |
| B. Pigmentation Step | | | | | |
| 7. Vinylic Filler Emulsion Composition Type Used | II-G | II-J | I-H | I-B | I-J |
| 8. Vinylic Filler Emulsion Parts | 500 | 800 | 800 | 500 | 800 |
| 9. Vinylic Filler Emulsion % Solids | 26.9 | 13.7 | 13.6 | 26.8 | 13.7 |
| 9A. Water, Dilution | 1000 | 800 | 800 | 1000 | 800 |
| 10. Bonding Components Heating (X) | X | X | X | X | X |
| Time, hours | 5 | 5 | 5 | 5 | 5 |
| Temperature, °C. | 80 | 80 | 80 | 80 | 80 |
| 11. Nitrogenous Material, Parts | $10^1$ | $4^5$ | $4^2$ | $10^1$ | — |
| 11A. Pigment Bonding Agent Material Parts | — | — | $2^{14}$ | — | $10^8$ |
| 11B. Soft Powdering Additive Parts | $35^f$ | $30^d$ | $30^e$ | $30^b$ | $30^b$ |
| 12. Approximate Volume | 1900 | 2000 | 2000 | 1900 | 2000 |
| 13. Coagulation Method | Alkali | Alcohol | Acid | Alcohol | Acid |
| 14. Isolation Method Spray Dry (S) | S | — | — | — | — |
| Filtration (X) | — | X | X | X | X |
| 15. Yield, Dry Vinylic Filler Color Pigment, Approx. | 190 | 160 | 160 | 185 | 160 |
| Example Number IV- | 36 | 37 | 38 | 39 | 40 |
| A. Micronizing Step | | | | | |

TABLE IV-continued
Preparation of Improved Colored Vinylic Filler Having the Coloring Pigment Bonded to the Surface Area of the Preformed Polymeric Particle

| | | | | | |
|---|---|---|---|---|---|
| 1. Pigment or Dye | Pigment | Pigment | Pigment | Pigment | Pigment |
| Color Class | FLU | FLU | FLU | FLU | FLU |
| Trade Name | (1) | (2) | (3) | (4) | (5) |
| Color Index Name | — | — | — | — | — |
| Color Index Number | — | — | — | — | — |
| Quantity, Parts, Dry Basis | 50 | 50 | 50 | 50 | 50 |
| 2. Dispersant Type - (anionic, nonionic, cationic, amphoteric, ester, polymeric) | anionic | nonionic | cationic | amphoteric | ester |
| Trade Name | Santomerse ME | Igapal CO 997 | Armac T | Deriphat 154 | Triton X QS 20 |
| Quantity, Parts, 100% Active | 20 | 10 | 15 | 20 | 10 |
| 3. Water, Quantity, Parts | 200 | 200 | 200 | 200 | 200 |
| Zonyl FSC | — | — | 1 | — | — |
| 4. Micronizing Method; (Sand Milling, Ball Milling, Other) | Sand | Ball | Ball | Sand | Sand |
| Sand, Parts | 300 | | | 300 | 300 |
| Time, Hours | 24 | 48 | 48 | 24 | 24 |
| Temperature, °C. | 28 | 28 | 28 | 28 | 28 |
| 5. Separation, Pigment & Micronizing Media - Screening (X) | X | X | X | X | X |
| Wash Water, Parts | 130 | 140 | 135 | 130 | 140 |
| 6. Yield, Aqueous Pigment Dispersion, Parts | 400 | 400 | 400 | 400 | 400 |
| B. Pigmentation Step | | | | | |
| 7. Vinylic Filler Emulsion Composition Type Used | I-B | II-F | I-G | III-A | III-D |
| 8. Vinylic Filler Emulsion, Parts | 500 | 500 | 500 | 500 | 800 |
| 9. Vinylic Filler Emulsion % Solids | 26.8 | 26.9 | 26.9 | 22.6 | 14.9 |
| 9A. Water Dilution | 1000 | 1000 | 1000 | 1000 | 800 |
| 10. Bonding Components Heating (X) | X | X | X | X | X |
| Time, hours | 5 | 4 | 4 | 5 | 5 |
| Temperature, °C. | 80 | 80 | 80 | 80 | 80 |
| 11. Nitrogenous Material, Parts | $10^1$ | $10^1$ | — | — | — |
| 11A. Pigment Bonding Agent Material Parts | $10^8$ | — | — | $2^{14}$ | — |
| 11B. Soft Powdering Additive, Parts | $30^c$ | $35^c$ | $30^e$ | $30^d$ | $30^g$ |
| 12. Approximate Volume | 1900 | 1900 | 1900 | 1900 | 2000 |
| 13. Coagulation Method | Acid | Alcohol | Alkali | Acid | Alcohol |
| 14. Isolation Method, Spray Dry (S) | — | S | — | S | — |
| Filtration (X) | X | — | X | — | X |
| 15. Yield, Dry Vinylic Filler Color Pigment, Approx. | 185 | 195 | 185 | 185 | 170 |
| Example Number IV | 41 | 42 | 43 | 44 | 45 |

| | | | | | |
|---|---|---|---|---|---|
| A. Micronizing Step | | | | | |
| 1. Pigment or Dye | Pigment | Pigment | Pigment | Pigment | Pigment |
| Color Class | Misc. | Misc. | Misc. | Misc. | Misc. |
| Trade Name | Green B | Aniline Black | Naphtol Green | Aniline Black | Green B |
| Color Index Name | Green 8 | Black 1 | Green 12 | Black 1 | Green 8 |
| Color Index Number | 10006 | 50440 | 10020 Lake | 50440 | 10006 |
| Quantity, Parts, Dry Basis | 50 | 50 | 50 | 50 | 50 |
| 2. Dispersant Type - (anionic, nonionic, cationic, amphoteric, ester, polymeric, | anionic | nonionic | cationic | anionic + polymeric | nonionic + amphoteric |
| Trade Name | Alipal CO 433 | Triton X 305 | Duomeen T | Duponol ME + Tamol 731 | Triton X405 + Tanaphem A600 |
| Quantity, Parts, 100% active | 20 | 10 | 10 | 2 + 8 | 10 + 10 |
| 3. Water, Quantity, Parts | 200 | 200 | 200 | 200 | 200 |
| Zonyl FSN | — | 1 | — | — | — |
| 4. Micronizing Method; (Sand Milling; Ball Milling, Other) | Sand | Ball | Sand | Ball | Sand |
| Sand, Parts | 300 | | 300 | | 300 |
| Time, Hours | 24 | 48 | 24 | 48 | 24 |
| Temperature, °C. | 28 | 28 | 28 | 28 | 28 |
| 5. Separation, Pigment and Micronizing Media - Screening (X) | X | X | X | X | X |
| Wash Water, Parts | 130 | 140 | 140 | 140 | 130 |
| 6. Yield, Aqueous Pigment Dispersion, Parts | 400 | 400 | 400 | 400 | 400 |
| B. Pigmentation Step | | | | | |
| 7. Vinylic Filler Emulsion Composition Type Used | I-B | I-H | II-H | II-J | III-A |
| 8. Vinylic Filler Emulsion, Parts | 500 | 800 | 800 | 800 | 600 |
| 9. Vinylic Filler Emulsion % Solids | 26.8 | 13.6 | 13.6 | 13.7 | 22.6 |
| 9A. Water Dilution | 1200 | 800 | 800 | 800 | 1000 |
| 10. Bonding Components Heating (X) | X | X | X | X | X |
| Time, hours | 5 | 4 | 4 | 4 | 5 |
| Temperature - °C. | 80 | 80 | 80 | 80 | 80 |
| 11. Nitrogenous Material, Parts | $10^1$ | — | — | — | — |
| 11A. Pigment Bonding Agent Material Parts | $10^{12}$ | — | — | $2^{14}$ | — |
| 11B. Soft Powdering Additive, Parts | $30^a$ | $30^g$ | $30^b$ | $30^f$ | $30^c$ |
| 12. Approximate Volume | 2100 | 2000 | 2000 | 2000 | 2000 |

TABLE IV-continued
Preparation of Improved Colored Vinylic Filler Having the Coloring Pigment Bonded to the Surface Area of the Preformed Polymeric Particle

| | | | | | |
|---|---|---|---|---|---|
| 13. Coagulation Method | Acid | Alcohol | Alkali | Acid | Alcohol |
| 14. Isolation Method, Spray Dry (S) | — | — | S | — | — |
| Filtration (X) | X | X | — | X | X |
| 15. Yield; Dry Vinylic Filler Color Pigment, Approx. | 185 | 160 | 170 | 160 | 165 |
| Example Number IV- | 46 | 47 | 48 | 49 | 50 |

| | | | | | |
|---|---|---|---|---|---|
| A. Micronizing Step | | | | | |
| 1. Pigment or Dye | Pigment | Pigment | Pigment | Pigment | Pigment |
| Color Class | Inorganic | Inorganic | Inorganic | Inorganic | Inorganic |
| Trade Name | Cadmium Yellow | Cadmium Red | Ultramarine Blue | Ferro Golden Yellow V 9112 | Ferro Hi-Q Green 7687 |
| Color Index Name | Yellow 37 | Red 108 | Blue 29 | — | — |
| Color Index Number | 77199 | 77196 | 77007 | — | — |
| Quantity, Parts, Dry Basis | 50 | 50 | 50 | 50 | 50 |
| 2. Dispersant Type - (anionic, nonionic, cationic, amphoteric ester, polymeric) | anionic | nonionic | anionic polymeric | anionic | amphoteric |
| Trade Name | Duponol ME | Triton X 405 | Tamol 731 | Alipal CO 433 | Tanaphen A 600 |
| Quantity, Parts, 100% Active | 10 | 10 | 10 | 20 | 20 |
| 3. Water, Quantity, Parts | 200 | 200 | 200 | 200 | 200 |
| 4. Micronizing Method; (Sand milling; ball milling, other) | Sand | Sand | Sand | Sand | Sand |
| Sand, Parts | 300 | 300 | 300 | 300 | 300 |
| Time, hours | 8 | 8 | 8 | 8 | 8 |
| Temperature, °C. | 28 | 28 | 28 | 28 | 28 |
| 5. Separation, Pigment and Micronizing Media - Screening (X) | X | X | X | X | X |
| Wash Water, Parts | 140 | 140 | 140 | 130 | 130 |
| 6. Yield, Aqueous Pigment Dispersion, Parts | 400 | 400 | 400 | 400 | 400 |
| B. Pigmentation Step | | | | | |
| 7. Vinylic Filler Emulsion Composition Type Used | I-B | I-J | III-A | III-C | II-C |
| 8. Vinylic Filler Emulsion Parts | 500 | 700 | 500 | 500 | 600 |
| 9. Vinylic Filler Emulsion % Solids | 26.8 | 13.7 | 22.6 | 33.3 | 18.2 |
| 9A. Water Dilution | 1000 | 800 | 1000 | 1500 | 800 |
| 10. Bonding Components Heating (X) | X | X | X | X | X |
| Time, hours | 5 | 4 | 5 | 5 | 5 |
| Temperature, °C. | 80 | 80 | 80 | 80 | 80 |
| 11. Nitrogenous Material, Parts | 10[1] | 10[1] | 4[3] | — | — |
| 11A. Pigment Bonding Agent Material, Parts | 10[12] | 10[13] | — | — | — |
| 11B. Soft Powdering Additive, Parts | 25[a] | 30[b] | 30[c] | 30[d] | 30[e] |
| 12. Approximate Volume | 1900 | 1900 | 1900 | 2400 | 1800 |
| 13. Coagulation Method | Acid | Acid | Alkali | Acid | Acid |
| 14. Isolation Method, Spray Dry (S) | — | — | — | — | S |
| Filtration (X) | X | X | X | X | — |
| 15. Yield: Dry Vinylic Filler Color Pigment, Approx. | 185 | 160 | 165 | 220 | 220 |
| Example Number IV- | 51 | 52 | 53 | 54 | 55 |

| | | | | | |
|---|---|---|---|---|---|
| A. Micronizing Step | | | | | |
| 1. Pigment or Dye | Insoluble Dye | Insoluble Dye | Insoluble Dye | Insoluble Dye | Insoluble Dye |
| Color Class | Solvent | Solvent | Solvent | Solvent | Solvent |
| Trade Name | Red OBJ | Chinoline Yellow | Blue OAP | Rubine R | Sudan Orange 11 |
| Color Index Name | Red 26 | Yellow 33 | Blue 36 | Red 52 | Orange 7 |
| Color Index Number | 26102 | 47000 | — | 68210 | 12140 |
| Quantity, Parts | 50 | 50 | 50 | 50 | 50 |
| 2. Dispersant Type, (anionic nonionic, cationic, amphoteric, ester, polymeric) | Nonionic | anionic | anionic polymeric | nonionic | anionic |
| Trade Name | Triton X 305 | DUponol ME | Tamol 731 | Triton X405 | Alipal CO 433 |
| Quantity, Parts | 10 | 10 | 10 | 10 | 20 |
| 3. Water, Quantity, Parts | 200 | 200 | 200 | 200 | 200 |
| Zonyl FSP | — | 1 | — | — | — |
| 4. Micronizing Method (Sand Milling, Ball Milling; other) | Ball | Ball | Sand | Sand | Ball |
| Sand, Parts | | | 300 | 300 | |
| Time, hours | 30 | 30 | 20 | 20 | 30 |
| Temperature, °C. | 28 | 28 | 28 | 28 | 28 |
| 5. Separation, Pigment & Micronizing Media - Screening (X) | X | X | X | X | X |
| Wash Water, Parts | 140 | 140 | 140 | 140 | 130 |
| 6. Yield, Aqueous Pigment Dispersion | 400 | 400 | 400 | 400 | 400 |
| B. Pigmentation Step | | | | | |
| 7. Vinylic Filler Emulsion Composition Type Used | III-D | II-A | II-H | I-G | I-B |
| 8. Vinylic Filler Emulsion Parts | 800 | 500 | 500 | 500 | 500 |
| 9. Vinylic Filler Emulsion | | | | | |

TABLE IV-continued
Preparation of Improved Colored Vinylic Filler Having the Coloring Pigment Bonded to the Surface Area of the Preformed Polymeric Particle

|  |  |  |  |  |  |
|---|---|---|---|---|---|
| % Solids | 14.9 | 25.7 | 26.9 | 26.9 | 26.8 |
| 9A. Water Dilution | 1000 | 1200 | 1200 | 1200 | 1200 |
| 10. Bonding Components |  |  |  |  |  |
| Heating (X) | X | X | X | X | X |
| Time, hours | 5 | 4 | 5 | 4 | 5 |
| Temperature, °C. | 80 | 80 | 80 | 80 | 80 |
| 11. Nitrogenous Material, Parts | — | — | 4[1] | — | — |
| 11A. Pigment Bonding Agent |  |  |  |  |  |
| Material, Parts | 10[9] | 10[10] | — | — | 2[14] |
| 11B. Soft Powdering Additive, Parts | 30[a] | 40[c] | 30[g] | 40[b] | 40[c] |
| 12. Approximate Volume | 2200 | 2100 | 2100 | 2100 | 2100 |
| 13. Coagulation Method | Acid | Acid | Acid | Acid | Acid |
| 14. Isolation Method, Spray Dry (S) | — | S | — | — | — |
| Filtration (X) | X | — | X | X | X |
| 15. Yield, Dry Vinylic Filler |  |  |  |  |  |
| Color Pigment, Approx. | 170 | 190 | 185 | 185 | 185 |

Foot Notes:
Dispersant Types
Alipal CO 433 - sodium salt of a sulfate ester of an alkylphenoxy poly(ethyleneoxy) ethanol, 28% active
Triton X.405 - octylphenxoy polyethoxy ethanol, 70% active
Duomeen T - N-tallow trimethylene diamine, 85% active
Duponol ME - sodium lauryl sulfate, 100% active
Tamol 731 - sodium salt of a polymeric carboxylic acid, 100% active
Tanaphen A.600 - modified phenolic derivative, 50% active
Triton X.305 - octylphenoxy polyethoxy ethanol, 70% active
Duomac T - N-tallow trimethylene diamine diacetate, 100% active
Sulfobetaine DC - stripped cocoa ammonium sulfonic acid betaine, 50% active
Santomerse ME - linear dodecylbenzene sodium sulfonate, 58% active
Igepal CO 997 - nonylphenoxy poly(ethyleneoxy)ethanol
Armac T - N-tallow amine acetate, 100% active
Deriphat 154 - disodium salt of N-tallow beta amino diproprionate
Triton XQ 15 - sodium salt of amphoteric surfactant, 100% acti
Monaquat TIBC - substituted imidazoline quaternized with benzyl chloride, 100% active
GAFAX RE 870 - free acid of complex organic phosphate ester, 100% active
Monazoline T - substituted imidazoline of tall oil, 100% active
Triton QS 44 - phosphate surfactant in free acid form, 80% active
Monateric CyNa - sodium salt of 2-caprylic-1-(ethyl beta oxipropanic acid) imidazoline, 50% active
Igepal CO.997 - nonylphenoxypoly(ethyleneoxy)ethanol, 100% active
Uniterge K - fatty nitrogen ether carboxylate amphoteric, 40% active
Triton X QS 20 - complex phosphate ester, 70% active
Tamol SN - sodium salt of condensed naphthalene sulfonic acid
Zonyl-FSA - anionic
Zonyl-FSC - cationic
Zonyl-FSB - amphoteric } fluorochemical surface active agents
Zonyl-FSN - nonionic
Zonyl-FSP - anionic (phosphate)

Nitrogenous Material
[1] tetraethylenepentamine
[2] substituted imidazoline of tall oil, as 20% aqueous solution
[3] benzyl chloride derivative of substituted imidazoline, as 20% aqueous solution
[4] N-tallow trimethylene diamine diacetate, as 20 % aqueous solution
[5] acetic acid salt of N-alkyl amine, as 20% aqueous solution
[6] N-alkyl trimethyl ammonium chloride as 20% aqueous solution
[7] di-stearyl dimethyl ammonium chloride, as 20% aqueous solution Pigment Bonding Material
[8] 28% "N" sodium silicate solution
[9] reaction product from condensation of 1 mol of urea with 1.25 mol formaldehyde, water dispersible
[10] reaction product from condensation of 1 mol of melamine with 1.5 mol formaldehyde, water dispersible
[11] reaction product from condensation of 1 mol of resorcinol with 1.5 mol formaldehyde, water dispersible
[12] PEI 18 - water soluble polyethylenimine manufactured by Dow
[13] PEI 600 - water soluble polyethylenimine manufactured by Dow
[14] Z6020 silane; water soluble organo-silane manufactured by Dow; [N-(2-aminoethyl)-3-aminopropyltrimethoxysilane]

Soft Powdering Additive
[a] 33% solution of dioctyl ester of sodium sulfosuccinic acid dissolved in solvent naptha
[b] 10% solution of sorbitan monolaurate dissolved in solvent naptha
[c] 10% solution of polyoxyethylene sorbitan monolaurate dissolved in Solvesso 140
[d] 10% solution of octylphenoxydiethoxyethanol dissolved in Solvesso 140
[e] 20% solution of bis(tridecyl) ester of sodium sulfosuccinic acid dissolved in solvent naptha
[f] 20% solution of di-tertiary-octyl sodium sulfosuccinate dissolved in stoddard solvent
[g] 20% solution of diamyl sodium sulfosuccinate dissolved in solvent naptha While there have been described herein what are at present considered preferred embodiments of the invention, it will be obvious to those skilled in the art that modifications and changes may be made therein without departing from the essence of the invention. It is, therefore, to be understood that the exemplary embodiments are illustrative and not restrictive of the invention, the scope of which is defined in the appended claims, and that all modifications that come within the meaning and range of equivalents of the claims are intended to be included therein.

We claim:

1. A process for producing an organic based pigment, which process consists essentially in (I) combining (a) an aqueous dispersion in the form of a latex of colloidal sized vinylic filler particles as hereinafter defined, (b) an aqueous dispersion of microground water insoluble pigment as hereinafter defined, (c) from 0 to an equal weight, based on the microground pigment present, of pigment bonding agent material as hereinafter defined and (d) from 0 to an equal weight based on the microground pigment present of nitrogenous material as hereinafter defined;

said vinylic filler (a) being made up essentially of polymer particles in the colloidal size range of about 5 millimicrons to about 4 microns average diameter and being three dimentionally cross-linked to insolubility in physical solvents, said particles having been prepared by cross-linking polymerization, in aqueous dispersion, of monomer material polymerizable therein and selected from the class consisting of the polymerizable monomers containing at least one carbon-to-carbon unsaturated group with the further limitation that the selected monomer material comprises cross-linking monomer material containing a plurality of such carbon-to-carbon unsaturated groups in at least a sufficient amount to effect, in said cross-linking polymerization, enough cross-linking within the particles to render them insoluble as aforesaid;

said microground pigment (b) being selected from the class consisting of the water insoluble organic and inorganic color and leuco pigments and having been microground to an average particle size which is less than 0.5 micron and which is less than the average particle size of the vinylic filler particles;

said dispersions (a) and (b) each containing and stabilized by surface active agent material and being combined in a weight ratio, dry basis, in the range of 200:1 to 1:2 based on the vinylic filler and microground pigment material;

said bonding agent material being selected from the class consisting of (i) water soluble and dispersible aminoplasts performed and formed in situ, (ii) water soluble and dispersible phenoplasts performed and formed in situ and (iii) water soluble and dispersible organic polymers having carboxyl, amine, sulfate or sulfonic acid groups and salts thereof; and said nitrogenous material being selected from the class consisting of (i) oleophilic amines, (ii) oleophilic imines, (iii) oleophilic amine carboxylates, (iv) the oleophilic quaternary ammonium compounds, (v) water soluble polyamines, (vi) water soluble polyimines, and (vii) combinations of two or more members of the foregoing;

(II) coagulating the combination formed in step (I) thereby affixing essentially all of said microground pigment to the surfaces of said vinylic filler particles; and (III) recovering the resulting organic based pigment.

2. A process according to claim 1, in which the vinylic filler latex (a) is a cross-linked emulsion polymerization product of ethylenically unsaturated monomer material the cross-linking component of which comprises material copolymerizable with vinyl monomers and selected from the unsaturated conjugated drying oils and their acids and derivatives of the foregoing, the ratio of said drying oil material to the other monomer material lying in the range of 0.2:99.8 to 20:80 by weight.

3. A process according to claim 1 in which the aqueous dispersion (b) is formed from relatively coarse water insoluble particulate pigment composition which is micronized in the aqueous phase of the dispersion (b) with the aid of any surface active agent material present therein until said pigment composition has primary particles of an average size below 0.5 micron in diameter.

4. A process according to claim 3 wherein said pigment composition is micronized in said aqueous phase until said pigment composition has primary particles of an average size below 0.2 micron in diameter.

5. A process according to claim 3 wherein the said pigment material is micronized in said aqueous phase with at least 2% by weight of the pigment bonding agent material (c) based on the pigment composition.

6. A process according to claim 3 wherein the said pigment composition is micronized in said aqueous phase with at least 2% by weight of the nitrogenous material (d) based on the pigment composition.

7. A process according to claim 1 wherein the surface active agent material employed in dispersion (b) comprises polymeric surface active agent.

8. A process according to claim 1, wherein said aqueous pigment dispersion provided in step (b) comprises organic color pigment.

9. A process according to claim 1, wherein said aqueous pigment dispersion provided in step (b) comprises inorganic pigment material.

10. A process according to claim 1, wherein said aqueous pigment dispersion provided in step (b) comprises an essentially homogenous mixture of two or more chemically different pigment materials.

11. A process according to claim 1, wherein step (III) is practiced by separating the serum from the coagulum to provide the vinylic pigment composition as a wet coagulum.

12. A process according to claim 1, wherein step (III) is practiced by separating the serum from the coagulum to provide the vinylic pigment composition as a wet coagulum and filtering and washing the wet coagulum.

13. A process according to claim 1, wherein step (III) is practiced by separating the serum from the coagulum to provide the vinylic pigment composition as a wet coagulum and drying the wet coagulum.

14. A process according to claim 1, wherein step (III) is practiced by separating the serum from the coagulum to provide the vinylic pigment composition as a wet coagulum and filtering, washing and drying the wet coagulum.

15. A process according to claim 1, wherein step (III) is practiced by separating the serum from the coagulum to provide the vinylic pigment composition as a wet coagulum and filtering, washing, reslurrying and spray drying the wet coagulum.

16. A process according to claim 1, wherein between step (II) and (III) the vinylic filler pigment coagulum is modified by treating with a sufficient amount in the range from 0.5 to 35% by weight, based on the vinylic filler present, of an agent selected from the class consisting of the aliphatic, cycloaliphatic and aromatic hydrocarbons and their alcohols having boiling points between 90° and 200° C. and mixtures thereof, for a sufficient time in the range of 25° to 100° C. to effect conditioning of said vinylic filler pigment coagulum so that it will not form hard agglomerates on drying, and thereafter drying the so treated product.

17. A process according to claim 16 in which the treating agent selected from the class consisting of the aliphatic and aromatic hydrocarbons and alcohols when applied to the vinylic filler pigment coagulum contains oil soluble surface active agent dissolved therein.

18. A process according to claim 17, wherein said treating agent is removed from the dried vinylic filler pigment by heating the same.

19. A vinylic pigment product consisting essentially of spheruloids of organic polymer material three dimensionally cross-linked to essential insolubility in any physical solvent and having primary particles in the colloidal sized range of about 5 millimicrons to not more than 4 microns average diameter, said particles having been prepared by cross-linking polymerization, in aqueous dispersion, of monomer material polymerizable therein and selected from the class consisting of the polymerizable monomers containing at least one carbon-to-carbon unsaturated group with the further limitation that the selected monomer material comprises cross-linking monomer material containing a plurality of such carbon-to-carbon unsaturated groups in at least a sufficient amount to effect, in said cross-linking polymerization, enough cross-linking within the particles to render them insoluble as aforesaid;

said spheruloid particles having fixed onto the surfaces thereof from 0.5 to 200% by weight based on the spheruloids of preformed microground insoluble pigment material having an average particle size which is below 0.5 micron in diameter and which is less than the average particle size of the vinylic filler spheruloids; and said product including from 0 to an equal weight based on the preformed pigment material present of a pigment bonding or modifying agent selected from the class consisting of (i) water soluble and dispersible aminoplasts preformed and formed in situ, (ii) water soluble and dispersible phenoplasts preformed and formed in situ and (iii) water soluble and dispersible organic polymers having carboxyl, amine, sulfate or sulfonic acid groups and salts thereof; and said product including from 0 to an equal weight based on the preformed pigment material present of nitrogenous material selected from the class consisting of (i) oleophilic amines, (ii) oleophilic imines, (iii) oleophilic amine carboxylates, (iv) the oleophilic quaternary ammonium compounds, (v) water soluble polyamines, (vi) water soluble polyimines, and (vii) combinations of two or more members of the foregoing.

20. A vinylic pigment product according to claim 19, wherein the pigment material fixed on the surfaces of said spheruloids has primary particles of an average size not exceeding 0.2 micron in diameter.

21. A vinylic pigment product according to claim 19, in the form of a wet coagulum.

22. A vinylic pigment product according to claim 19, in powder form.

23. A vinylic filler pigment product according to claim 19, which has been treated in aqueous medium without previously having been dried with from 0.5 to 35% by weight, based on the vinylic filler pigment present, of an agent selected from the class of aliphatic, cycloaliphatic and aromatic hydrocarbons and their alcohols having boiling points between 90° C. and 200° C., and mixtures thereof, and has thereafter been subjected to drying, said product being in soft, readily dispersible dry form.

24. A product as defined in claim 23, which is essentially free of water soluble salts and diluents.

25. A product as defined in claim 23, in spray dried form.

26. A vinylic pigment product according to claim 19, in which the pigment material fixed on the surface of the vinylic filler material consists of an essentially homogenous mixture of two or more chemically different pigment materials.

* * * * *